US009916015B2

United States Patent
Nakasu et al.

(10) Patent No.: US 9,916,015 B2
(45) Date of Patent: Mar. 13, 2018

(54) RECOGNITION DEVICE, RECOGNITION METHOD, AND NON-TRANSITORY RECORDING MEDIUM

(71) Applicant: KABUSHIKI KAISHA TOSHIBA, Tokyo (JP)

(72) Inventors: Toshiaki Nakasu, Tokyo (JP); Tsukasa Ike, Tokyo (JP); Yasunobu Yamauchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/853,124

(22) Filed: Sep. 14, 2015

(65) Prior Publication Data
US 2016/0077608 A1    Mar. 17, 2016

(30) Foreign Application Priority Data

Sep. 17, 2014    (JP) .................................. 2014-189472

(51) Int. Cl.
| | | |
|---|---|---|
| *G06F 3/0346* | (2013.01) | |
| *G06F 3/0487* | (2013.01) | |
| *G06F 3/03* | (2006.01) | |
| *G06F 3/0485* | (2013.01) | |

(52) U.S. Cl.
CPC .......... *G06F 3/0346* (2013.01); *G06F 3/0325* (2013.01); *G06F 3/0485* (2013.01); *G06F 3/0487* (2013.01)

(58) Field of Classification Search
CPC .......... G06F 3/016; G06F 3/011; G06F 3/038; G06F 3/0346
See application file for complete search history.

(56) References Cited

U.S. PATENT DOCUMENTS

| | | | |
|---|---|---|---|
| 5,579,033 A | 11/1996 | Rutledge et al. | |
| 9,226,330 B2 * | 12/2015 | Abdurrahman | ..... H04W 76/023 |

(Continued)

FOREIGN PATENT DOCUMENTS

| | | |
|---|---|---|
| JP | 2004-54390 | 2/2004 |
| JP | 2005-050159 | 2/2005 |

(Continued)

OTHER PUBLICATIONS

Madgwick et al., "Estimation of IMU and MARG orientation using a gradient descent algorithm", *2011 IEEE International Conference on Rehabilitation Robotics*, vol. 22, No. 6, Jun. 2011, seven pages.

(Continued)

*Primary Examiner* — Alexander Eisen
*Assistant Examiner* — Mansour M Said
(74) *Attorney, Agent, or Firm* — Nixon & Vanderhye, P.C.

(57) ABSTRACT

A recognition device includes an acquisition unit and a processor. The acquisition unit acquires first and second informations. The first information relates to a first signal corresponding to a state of a first portion of a body performing an action. The first signal is generated by a first element mounted to the first portion. The second information relates to a second signal corresponding to a state of a second portion. The second signal is generated by a second element mounted to the second portion. A relative positional relationship between the first portion and the second portion changes according to the action. The processor calculates a first feature based on the first information and a second feature based on the second information. The processor recognizes a type of the action based on a change of the first feature and a change of the second feature.

19 Claims, 24 Drawing Sheets

(56) References Cited

U.S. PATENT DOCUMENTS

| | | | |
|---|---|---|---|
| 2004/0012559 A1 | 1/2004 | Seki et al. | |
| 2004/0012564 A1* | 1/2004 | Zngf | G06F 3/014 345/158 |
| 2005/0052412 A1 | 3/2005 | McRae et al. | |
| 2011/0007035 A1 | 1/2011 | Shai | |
| 2011/0199303 A1* | 8/2011 | Simpson | G06F 3/011 345/158 |
| 2013/0027300 A1 | 1/2013 | Nakasu et al. | |
| 2013/0036389 A1 | 2/2013 | Ohira et al. | |
| 2013/0147722 A1* | 6/2013 | Lin | G06F 3/014 345/173 |
| 2014/0176439 A1 | 6/2014 | Keller et al. | |
| 2015/0138075 A1 | 5/2015 | Nakasu et al. | |

FOREIGN PATENT DOCUMENTS

| | | |
|---|---|---|
| JP | 2007-504559 | 3/2007 |
| JP | 2008-135033 | 6/2008 |
| JP | 2009-064053 | 3/2009 |
| JP | 2009-104429 | 5/2009 |
| JP | 2010-537302 | 12/2010 |
| JP | 2011-170747 | 9/2011 |
| JP | 2011-175315 | 9/2011 |
| JP | 2013-030134 | 2/2013 |
| JP | 2013-037467 | 2/2013 |
| JP | 2014-164428 | 9/2014 |
| JP | 2015-099574 | 5/2015 |

OTHER PUBLICATIONS

English-language machine translation of JP2008-135033.
English-language machine translation of JP2009-064053.
English-language machine translation of JP2009-104429.
English-language machine translation of JP2011-170747.
English-language machine translation of JP2011-175315.
English-language machine translation of JP2014-164428.

* cited by examiner

| \|Θ1\| ≧ Θt1 ? | \|Θ2\| ≧ Θt2 ? | Θ1 AND Θ2 SAME DIRECTION? | ACTION |
|---|---|---|---|
| YES | YES | YES | TOUCHPAD ACTION |
| YES | YES | NO | JOYSTICK ACTION |
| YES | NO | YES | TOUCHPAD ACTION |
| YES | NO | NO | TOUCHPAD ACTION |
| NO | YES | YES | TOUCHPAD ACTION |
| NO | YES | NO | TOUCHPAD ACTION |
| NO | NO | YES | ARBITRARY |
| NO | NO | NO | ARBITRARY |

FIG. 13

RECOGNITION DEVICE, RECOGNITION METHOD, AND NON-TRANSITORY RECORDING MEDIUM

CROSS-REFERENCE TO RELATED APPLICATIONS

This application is based upon and claims the benefit of priority from Japanese Patent Application No. 2014-189472, filed on Sep. 17, 2014; the entire contents of which are incorporated herein by reference.

FIELD

Embodiments described herein relate generally to a recognition device and a recognition method and a non-transitory recording medium.

BACKGROUND

There is a recognition device that is mounted to a designated portion (a finger, a wrist, an upper arm, etc.) of the body of a user and recognizes an action (gesture) of the user. A device such as a PC (personal computer), a television, or the like is operated using the recognition device. It is desirable to reduce the operation burden of the user.

BRIEF DESCRIPTION OF THE DRAWINGS

FIG. 13 shows the recognition conditions of the recognition device according to the first embodiment;

DETAILED DESCRIPTION

Figure 1A:
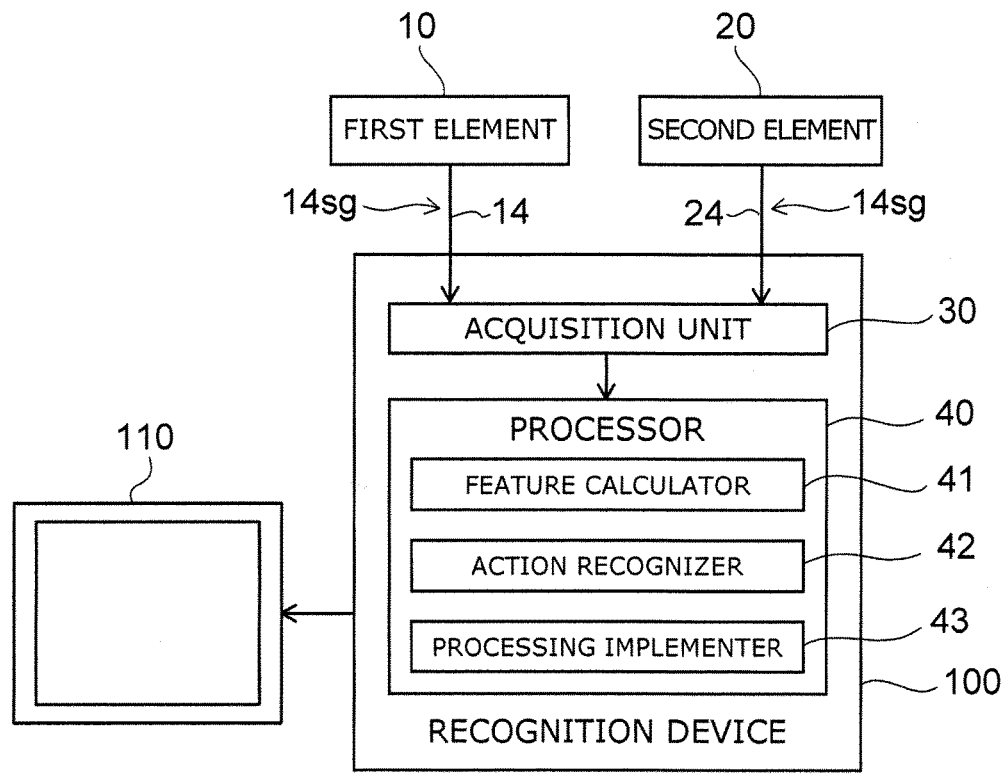
FIG. 1A and FIG. 1B are block diagrams showing a recognition device according to a first embodiment.

According to one embodiment, a recognition device includes an acquisition unit and a processor. The acquisition unit acquires first information and second information. The first information relates to a first signal. The first signal corresponds to a state of a first portion of a body performing an action. The state of the first portion changes according to the action. The first signal is generated by a first element mounted to the first portion. The second information relates to a second signal. The second signal corresponds to a state of a second portion. The state of the second portion changes according to the action. The second signal is generated by a second element mounted to the second portion. A relative positional relationship between the first portion and the second portion changes according to the action. The processor calculates a first feature of the first portion based on the first information. The processor calculates a second feature of the second portion based on the second information. The processor recognizes a type of the action based on a change of the first feature and a change of the second feature.

According to one embodiment, a recognition method includes acquiring first information and second information. The first information relates to a first signal. The first signal corresponds to a state of a first portion of a body performing an action. The state of the first portion changes according to the action. The first signal is generated by a first element mounted to the first portion. The second information relates to a second signal. The second signal corresponds to a state of a second portion. The state of the second portion changes according to the action. The second signal is generated by a second element mounted to the second portion. A relative positional relationship between the first portion and the second portion changes according to the action. The method includes calculating a first feature of the first portion based on the first information, calculating a second feature of the second portion based on the second information, and recognizing a type of the action based on a change of the first feature and a change of the second feature.

According to one embodiment, a non-transitory recording medium records a recognition program. The recognition program causes a computer to execute acquiring first information and second information. The first information relates to a first signal. The first signal corresponds to a state of a first portion of a body performing an action. The state of the first portion changes according to the action. The first signal is generated by a first element mounted to the first portion. The second information relates to a second signal. The second signal corresponds to a state of a second portion. The state of the second portion changes according to the action. The second signal is generated by a second element mounted to the second portion. A relative positional relationship between the first portion and the second portion changes according to the action. The program causes the computer to execute calculating a first feature of the first portion based on the first information, calculating a second feature of the second portion based on the second information, and recognizing a type of the action based on a change of a first feature and a change of the second feature.

Various embodiments of the invention will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1B:
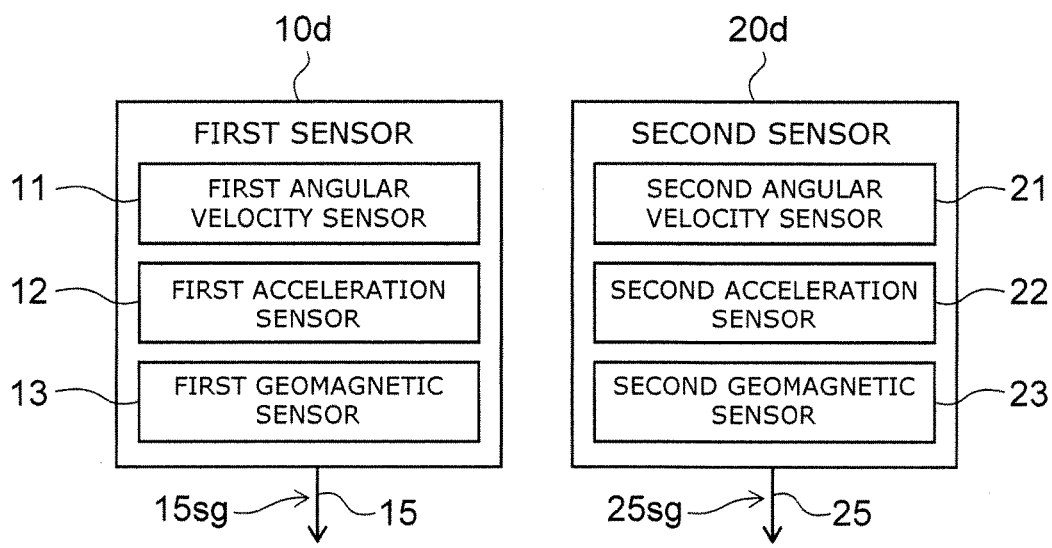

FIG. 1A and FIG. 1B are block diagrams showing a recognition device according to a first embodiment.

FIG. 1A shows an example of the configuration of the recognition device. FIG. 1B shows an example of a first element and a second element.

An acquisition unit 30 and a processor 40 are provided in the recognition device 100. The acquisition unit 30 includes, for example, an input/output terminal. The acquisition unit 30 includes an input/output interface that communicates with the outside via a wired or wireless method. The processor 40 includes, for example, a calculator including a CPU, memory, etc. A portion of each block or each entire block of the processor 40 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as one body; or some blocks may be provided separately. Also, for each block, a portion of the block may be provided separately. The integration is not limited to LSI; and a dedicated circuit or a general-purpose processor may be used.

As shown in FIG. 1B, for example, a first sensor 10d is used as the first element 10; and, for example, a second sensor 20d is used as the second element 20. The recognition device 100 may be provided as one body with the first element 10 or the second element 20. The recognition device 100 may be provided as one body with an operation object device operated based on the recognition result of the recognition device 100. The operation object device is, for example, a PC (personal computer) 110. The recognition device 100 may be provided independently of the first element 10, the second element 20, and the PC 110. One portion of the recognition device 100 may be provided as one body with the first element 10 or the second element 20; and one other portion of the recognition device 100 may be provided as one body with the PC 110.

The recognition device 100 is connected to the first element 10 and the second element 20 by a wired or wireless method. The recognition device 100 is connected to the operation object device (e.g., the PC 110) by a wired or wireless method.

Figure 2A:
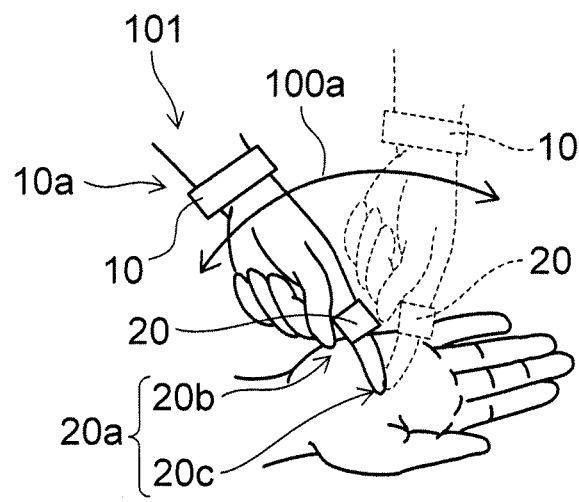
FIG. 2A and FIG. 2B are schematic views showing the recognition device according to the first embodiment.
Figure 2B:
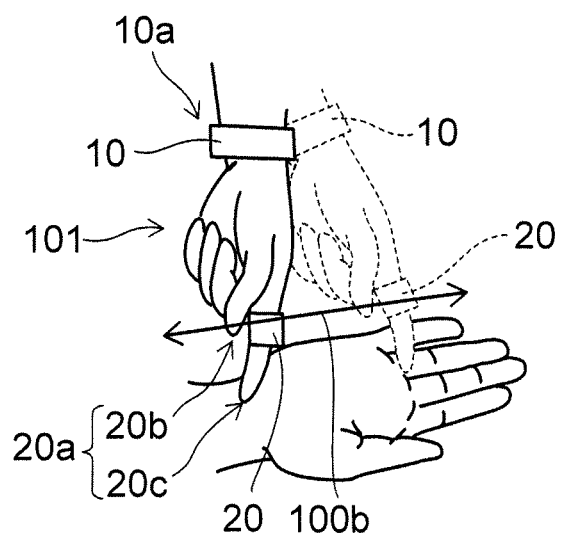

FIG. 2A and FIG. 2B are schematic views showing the recognition device according to the first embodiment.

These drawings show states of use of the recognition device. FIG. 2A shows an example of a joystick action by a user. FIG. 2B shows an example of a touchpad action by the user.

The first sensor 10d (the first element 10) and the second sensor 20d (the second element 20) are used by being mounted to designated portions of the body 101 of the user. For example, the first element 10 is mounted to a first portion 10a (e.g., a wrist). The second element 20 is mounted to a second portion 20a (e.g., a finger). The recognition device 100 uses the first element 10 to sense the action of the first portion 10a such as the wrist, etc., and uses the second element 20 to sense the action of the second portion 20a such as the finger, etc. The recognition device 100 recognizes the type of the action of the body 101 based on the sensing results of the first element 10 and the second element 20. The type of the action of the body 101 includes, for example, a joystick action, a touchpad action, etc.

In the examples of FIG. 2A and FIG. 2B, the first element 10 includes a ring-shaped member mountable to the first portion 10a. The second element 20 includes a ring-shaped member mountable to the second portion 20a. The configurations of the first element 10 and the second element 20 are not limited thereto.

The example of FIG. 2A shows a first action (e.g., a joystick action) of the user. The joystick action includes moving one other portion 20b of the second portion 20a using an end 20c of the second portion 20a as a fulcrum. In FIG. 2A, the one other portion 20b moves along the direction of arrow 100a. The example of FIG. 2B shows a second action (e.g., a touchpad action) of the user. The touchpad action includes moving both the one other portion 20b of the second portion 20a and the end 20c of the second portion 20a. In FIG. 2B, the one other portion 20b moves along the direction of arrow 100b.

In FIG. 1A, FIG. 2A, and FIG. 2B, the first element 10 is mounted to the first portion 10a of the body 101 performing the action. The acquisition unit 30 acquires first information 14. The first information 14 is information relating to a first signal 14sg generated by the first element 10. The first signal 14sg corresponds to the state of the first portion 10a changing according to the action of the body 101. For example, a first sensor signal 15sg that is generated by the first sensor 10d shown in FIG. 1B is used as the first signal 14sg. For example, first sensor information 15 that includes the value of the first sensor signal 15sg is used as the first information 14. In the example of FIG. 1B, the first sensor 10d outputs the first sensor information 15; and the acquisition unit 30 acquires the first sensor information 15.

In FIG. 1A, FIG. 2A, and FIG. 2B, the second element 20 is mounted to the second portion 20a. The relative positional relationship between the first portion 10a of the second portion 20a changes according to the action of the body 101. The acquisition unit 30 acquires second information 24. The second information 24 is information relating to a second signal 24sg generated by the second element 20. The second signal 24sg corresponds to the state of the second portion 20a changing according to the action of the body 101. For example, a second sensor signal 25sg that is generated by the second sensor 20d shown in FIG. 1B is used as the second signal 24*sg*. For example, second sensor information 25 that includes the value of the second sensor signal 25*sg* is used as the second information 24. In the example of FIG. 1B, the second sensor 20*d* outputs the second sensor information 25; and the acquisition unit 30 acquires the second sensor information 25.

The processor 40 includes a feature calculator 41, an action recognizer 42, and a processing implementer 43. The portions of the processor 40 are not necessarily provided as one body; and a portion of the processor 40 may be provided separately in the PC 110, etc. For example, the processing implementer 43 may be provided in the PC 110.

The feature calculator 41 calculates the first feature of the first portion 10*a* based on the first information 14 and calculates the second feature of the second portion 20*a* based on the second information 24. In the embodiment, for example, the first portion 10*a* is the wrist of the body 101. The first feature includes a value relating to the tilt inside a three-dimensional space of a first axis (a virtual axis) of the first portion 10*a*. This value includes first to third angles relating to the first axis. The first to third angles are angles respectively between the first axis and three axes intersecting each other inside the three-dimensional space. As a specific example, the first to third angles are expressed as viewed from the first element 10 as a pitch angle which is the rotation angle of the vertical direction having left and right as an axis, a yaw angle which is the rotation angle of the lateral direction having up and down as an axis, and a roll angle which is the rotation angle having frontward and rearward as an axis.

The second portion 20*a* is a portion having a relative positional relationship between the first portion 10*a* and the second portion 20*a* that changes according to the action of the body 101. In the embodiment, the second portion 20*a* is, for example, a finger (an index finger, etc.) of the body 101. The second feature includes a value relating to the tilt inside the three-dimensional space of a second axis (a virtual axis) of the second portion 20*a*. This value includes fourth to sixth angles relating to the second axis. The fourth to sixth angles are angles respectively between the second axis and the three axes intersecting each other inside the three-dimensional space. As a specific example, the fourth to sixth angles are expressed as viewed from the second element 20 as the pitch angle which is the rotation angle of the vertical direction having left and right as the axis, the yaw angle which is the rotation angle of the lateral direction having up and down as the axis, and the roll angle which is the rotation angle having frontward and rearward as the axis.

The action recognizer 42 recognizes whether the type of the action of the body 101 is one of the joystick action or the touchpad action based on the change of the first feature and the change of the second feature. The change of the first feature is, for example, the change (hereinbelow, called a first change) of at least one of the first to third angles (e.g., the pitch angle, the yaw angle, or the roll angle) relating to the first axis. Similarly, the change of the second feature is, for example, the change (hereinbelow, called a second change) of at least one of the fourth to sixth angles (e.g., the pitch angle, the yaw angle, or the roll angle) relating to the second axis.

In other words, the action recognizer 42 recognizes whether the type of the action of the body 101 is one of the joystick action or the touchpad action based on a first absolute value of the first change, a first polarity of the first change, a second absolute value of the second change, and a second polarity of the second change.

The processing implementer 43 implements the type of the action (e.g., processing corresponding to the one of the joystick action or the touchpad action) on an operation object operated by the action of the body 101. The operation object is, for example, an object displayed on the screen of the PC 110. The object includes, for example, a mouse cursor, an image, a designated portion inside an image, etc. The PC 110 is an example of the operation object device. A television receiver, etc., may be used as the PC 110. The operation object device is not limited thereto.

In the embodiment, the tilt of the first portion 10*a* is the angle of the first portion 10*a*. The angle of the first portion 10*a* includes angles respectively from the three axes intersecting each other inside the three-dimensional space. The tilt of the second portion 20*a* is the angle of the second portion 20*a*. The angle of the second portion 20*a* includes angles respectively from the three axes intersecting each other inside the three-dimensional space. For example, the three axes inside the three-dimensional space are taken as, for example, an X-axis, a Y-axis, and a Z-axis orthogonal to each other inside the three-dimensional space. One direction perpendicular to the X-axis direction is taken as the Y-axis direction. A direction perpendicular to the X-axis direction and perpendicular to the Y-axis direction is taken as the Z-axis direction.

In FIG. 1B, the first sensor 10*d* which is an example of the first element 10 includes a first angular velocity sensor 11, a first acceleration sensor 12, and a first geomagnetic sensor 13. The first angular velocity sensor 11 outputs the angular velocity values for each of the X-axis, the Y-axis, and the Z-axis. The first acceleration sensor 12 outputs the acceleration values for each of the X-axis, the Y-axis, and the Z-axis. The first geomagnetic sensor 13 outputs the geomagnetism values for each of the X-axis, the Y-axis, and the Z-axis. In other words, the first sensor information 15 that is output by the first sensor 10*d* is information relating to at least one of the angular velocity value, the acceleration value, or the geomagnetism value.

The first sensor 10*d* is, for example, a general 9-axis sensor that can acquire the three-dimensional angular velocity value, acceleration value, and geomagnetism value of the first portion 10*a* to which the first sensor 10*d* is mounted. For example, the first angular velocity sensor 11 is used as the first sensor 10*d*. For example, the first acceleration sensor 12 may be used as the first sensor 10*d*. For example, the first angular velocity sensor 11 and the first acceleration sensor 12 are used as the first sensor 10*d*. For example, the first angular velocity sensor 11 and the first geomagnetic sensor 13 are used as the first sensor 10*d*. For example, the first acceleration sensor 12 and the first geomagnetic sensor 13 are used as the first sensor 10*d*.

For example, the second sensor 20*d* includes a second angular velocity sensor 21, a second acceleration sensor 22, and a second geomagnetic sensor 23. The second angular velocity sensor 21 outputs the angular velocity values for each of the X-axis, the Y-axis, and the Z-axis. The second acceleration sensor 22 outputs the acceleration values for each of the X-axis, the Y-axis, and the Z-axis. The second geomagnetic sensor 23 outputs the geomagnetism value for each of the X-axis, the Y-axis, and the Z-axis. In other words, the second sensor information 25 that is output by the second sensor 20*d* is information relating to at least one of the angular velocity value, the acceleration value, or the geomagnetism value.

The second sensor 20*d* is, for example, a general 9-axis sensor that can acquire the three-dimensional angular velocity value, acceleration value, and geomagnetism value of the second portion 20a to which the second sensor 20d is mounted. For example, the second angular velocity sensor 21 is used as the second sensor 20d. For example, the second acceleration sensor 22 is used as the second sensor 20d. For example, the second angular velocity sensor 21 and the second acceleration sensor 22 are used as the second sensor 20d. For example, the second angular velocity sensor 21 and the second geomagnetic sensor 23 are used as the second sensor 20d. For example, the second acceleration sensor 22 and the second geomagnetic sensor 23 are used as the second sensor 20d.

For example, the angular velocity sensor senses the angular velocity as a physical quantity. In the example, a vibration-type sensor is employed in which the angular velocity applied to the angular velocity sensor is sensed by sensing the vibration of a weight. In such a vibration-type angular velocity sensor, an angular velocity that is applied to the weight vibrating (having a primary vibration) in some one direction causes a so-called Coriolis force to act on the weight. The vibration-type angular velocity sensor utilizes the occurrence of a vibration (a secondary vibration) in a direction orthogonal to the weight due to the Coriolis force. In the example, the secondary vibration is sensed by a piezoelectric element and converted into an electrical signal; and the electrical signal is output as a sense signal (an angular velocity value) corresponding to the angular velocity.

Here, the three-dimensional tilt (the angle) of the designated portion can be obtained by converting from an integration operation of the angular velocity or from the acceleration due to gravity. However, in the case where the integration operation of the angular velocity is performed, the drift error that is included in the output of the angular velocity sensor accumulates; and the precision may decrease as the measurement time elapses. In the case of converting from the acceleration due to gravity, because the orientation information is not obtained, the dynamic acceleration that is output by the acceleration sensor may result in an error. Accordingly, to obtain a more precise three-dimensional tilt, it is favorable to use the angular velocity sensor, the acceleration sensor, and the geomagnetic sensor.

Here, for the recognition device, for example, a method is known for calculating the three-dimensional tilt of the sensor based on at least one value of the acceleration, the angular velocity, or the geomagnetism acquired by the sensor. The three-dimensional tilt is expressed as viewed from the sensor as the pitch angle which is the rotation angle of the vertical direction using left and right as the axis, the yaw angle which is the rotation angle of the lateral direction using up and down as the axis, and the roll angle which is the rotation angle using frontward and rearward as the axis. For example, in the case where the sensor is mounted to the arm (the wrist), the tilt of the sensor has a pseudo-correspondence to the tilt of the arm. The three-dimensional tilt of the sensor is associated with a relative position of the screen. Thereby, for example, it is possible to perform a remote operation of a cursor on the screen corresponding to the tilt of the arm of the user. The user can move and operate the cursor on the screen using a pointing action (gesture) from afar without using an input device such as a touchpad, a joystick, etc. For example, such technology is used when operating a device such as a PC (personal computer), a television, etc.

Figure 3:
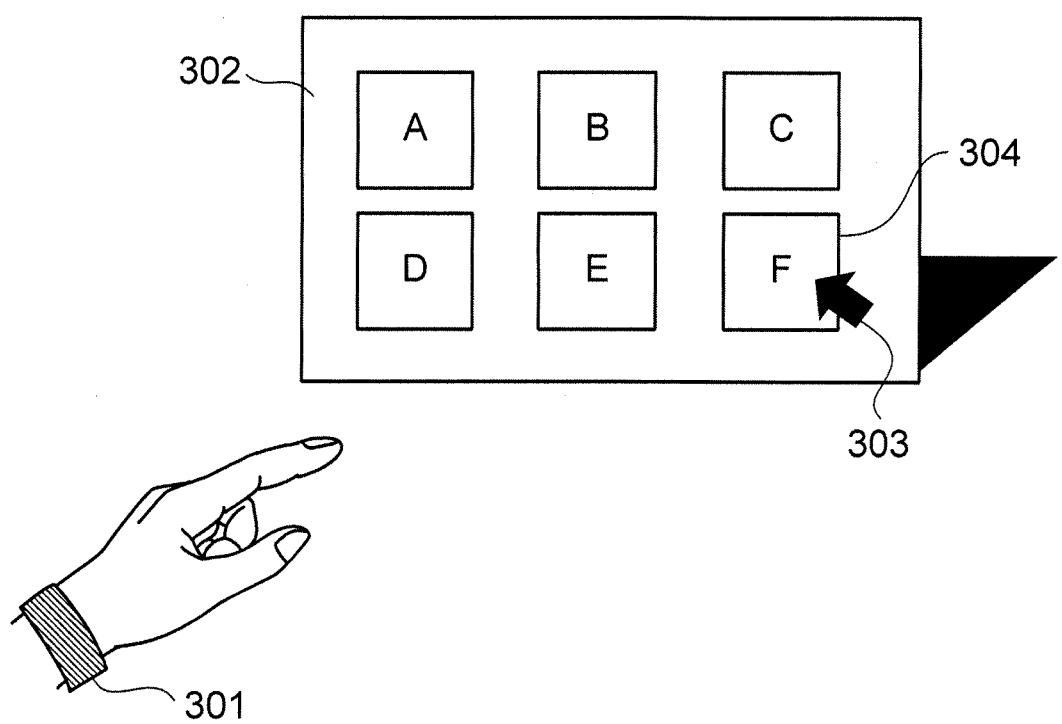
FIG. 3 shows a device operation.

FIG. 3 shows a device operation.

In the example of FIG. 3, for example, at least one value of the acceleration, the angular velocity, or the geomagnetism is acquired from a sensor 301 mounted to the wrist. Based on these values, a cursor 303 inside a screen 302 of the display device is moved to a designated position. For example, an object 304 disposed inside the screen 302 is pointed to (selected) by moving the cursor 303 onto the object 304. Also, by mounting the sensor 301 to the finger and by analyzing the movement path of the finger, characters written by the finger at any location (in air, the palm of the hand, the thigh, a desk, etc.) can be recognized.

The action modes of a device such as a PC, a television, etc., include, for example, a joystick mode in which a joystick is used as the input device, and a touchpad mode in which a touchpad is used as the input device. In the case where the two action modes (the joystick mode and the touchpad mode) are implemented by an action (gesture) of the user, it has been necessary for a menu to be displayed on the screen of the device and for the user to select one of the action modes from the menu.

However, the number of steps undesirably increases when going through the menu levels; and the user is burdened. Therefore, it is desirable to reduce the operation burden of the user by correctly recognizing the action of the user to automatically switch between the two action modes.

Specifically, the user action in the joystick mode is an action of placing the finger tip upright on a surface, using the finger tip as a fulcrum, and changing the tilt of the finger. The user action in the touchpad mode is an action of moving the finger tip on the surface. That is, the actions of the user relating to the device operations include the first action (the joystick action) that performs the operation by placing the finger tip upright on a surface, using the finger tip as the fulcrum, and changing the tilt of the finger, and the second action (the touchpad action) that performs the operation by moving the finger tip on the surface and tracking the movement.

According to the embodiment, the types of the action by the user (e.g., the joystick action and the touchpad action) are correctly recognized; and the action modes of the operation object device can be switched according to the type of the action of the user. Thereby, the operation burden of the user can be reduced.

Figure 4:
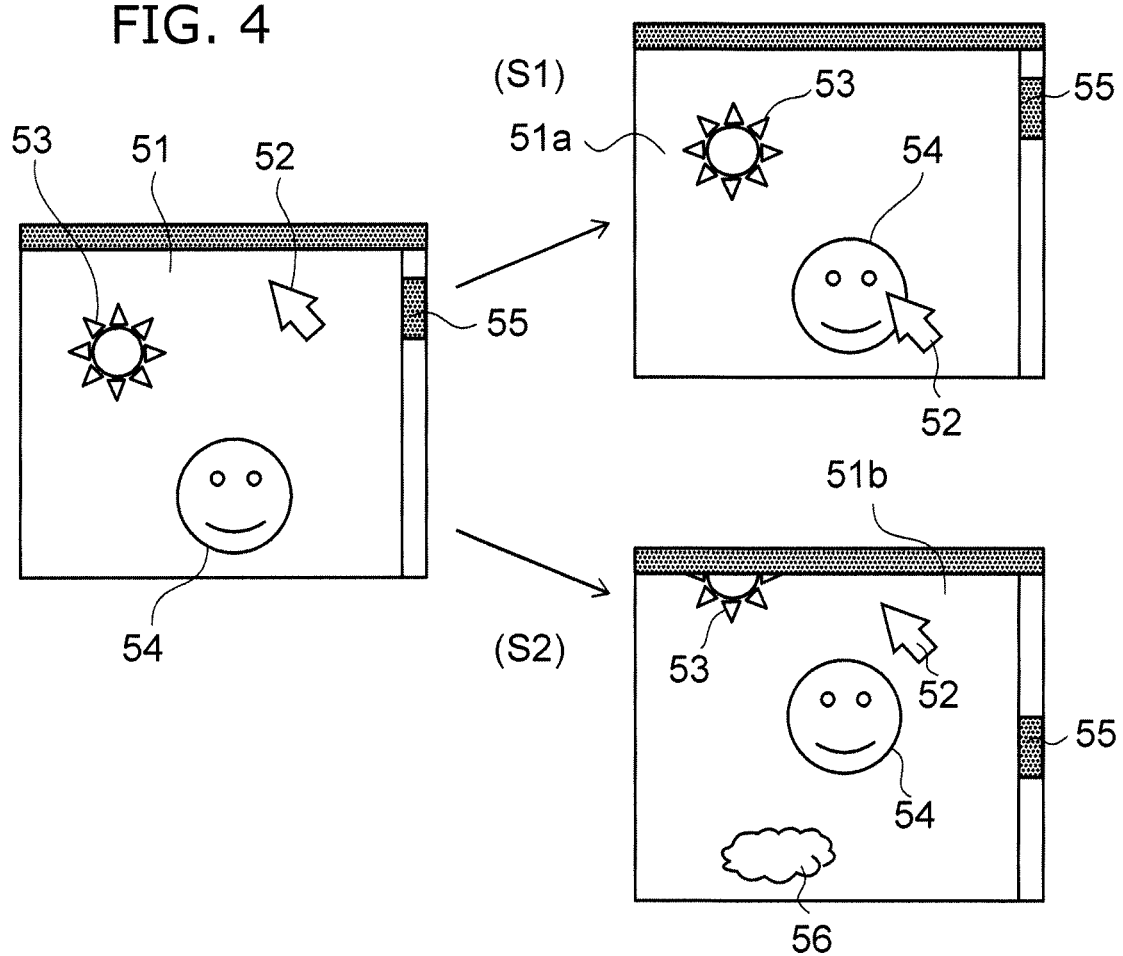
FIG. 4 is a schematic view showing device operations of the recognition device according to the first embodiment.

FIG. 4 is a schematic view showing device operations of the recognition device according to the first embodiment.

FIG. 4 shows an example of the case where the browser screen is operated by switching between the two action modes of the PC 110 using the recognition device 100.

A mouse cursor 52, a first object 53, a second object 54, and a scroll bar 55 are displayed in a browser screen 51 of the PC 110. In the case where the action recognizer 42 recognizes the type of the action of the user to be a downward joystick action (the case of S1), the processing implementer 43 switches the action mode of the PC 110 to the joystick mode. In the joystick mode, for example, the mouse cursor 52 is moved. Specifically, the mouse cursor 52 that is displayed inside the browser screen 51 is moved in the downward direction; and the browser screen transitions to a browser screen 51a.

On the other hand, in the case where the action recognizer 42 recognizes the type of the action of the user to be an upward touchpad action (the case of S2), the processing implementer 43 switches the action mode of the PC 110 to the touchpad mode. In the touchpad mode, for example, the browser screen 51 is scrolled. Specifically, the first object 53 and the second object 54 that are displayed inside the browser screen 51 are moved relatively in the upward direction; a third object 56 that was hidden below the screen is displayed; and the browser screen transitions to a browser screen 51b.

Figure 5:
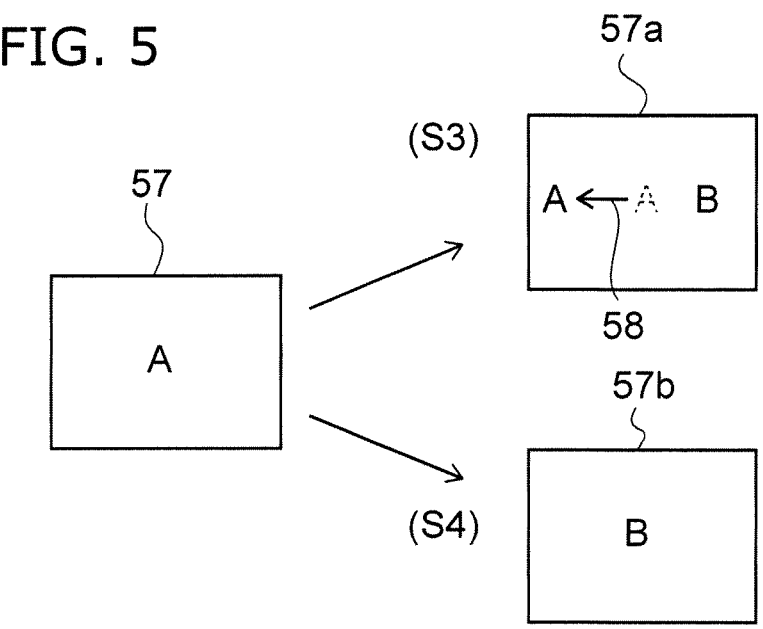
FIG. 5 is a schematic view showing other device operations of the recognition device according to the first embodiment.

FIG. 5 is a schematic view showing other device operations of the recognition device according to the first embodiment.

FIG. 5 shows an example of the case where an image viewing screen is operated by switching between the two action modes of the PC 110 using the recognition device 100.

A character A is displayed in an image viewing screen 57 of the PC 110. In the case where the action recognizer 42 recognizes the type of the action of the user to be a leftward joystick action (the case of S3), the processing implementer 43 switches the action mode of the PC 110 to the joystick mode. In the joystick mode, the entire display region is moved in the direction of arrow 58 (leftward). That is, when the finger of the user is maintained at a tilt not less than a prescribed angle, the display region including the character A moves in the direction in which the finger is tilted while the angle is maintained; a character B that was hidden outside the screen is displayed; and the image viewing screen transitions to an image viewing screen 57a.

On the other hand, in the case where the action recognizer 42 recognizes the type of the action of the user to be a leftward touchpad action (the case of S4), the processing implementer 43 switches the action mode of the PC 110 to the touchpad mode. In the touchpad mode, the character B of the next page is displayed. That is, when a flick action of the finger of the user (an action of flicking the finger) is performed in a prescribed direction, the page is switched in the direction of the flick; the character B of the next page is displayed; and the image viewing screen transitions to an image viewing screen 57b.

As another example, the joystick action and the touchpad action may be selectively used for the cursor operation and the character input operation. For example, when the finger has the joystick action, the cursor operation for the device is performed. On the other hand, when the finger has the touchpad action, character input for the device is performed by recognizing the characters using the movement path of the finger.

As another example, the joystick action and the touchpad action may be selectively used for two monitors. For example, operations may be performed for content for a first monitor having a large screen disposed to be distal and a second monitor disposed to be proximal. In the distal first monitor, pointing is implemented by the operation by the touchpad action. In the proximal second monitor, the operation is implemented by the joystick action by placing the finger upright on a desk, a knee, etc. Intuitive operations can be implemented for both the operation for the distal first monitor and the operation for the proximal second monitor.

Figure 6:
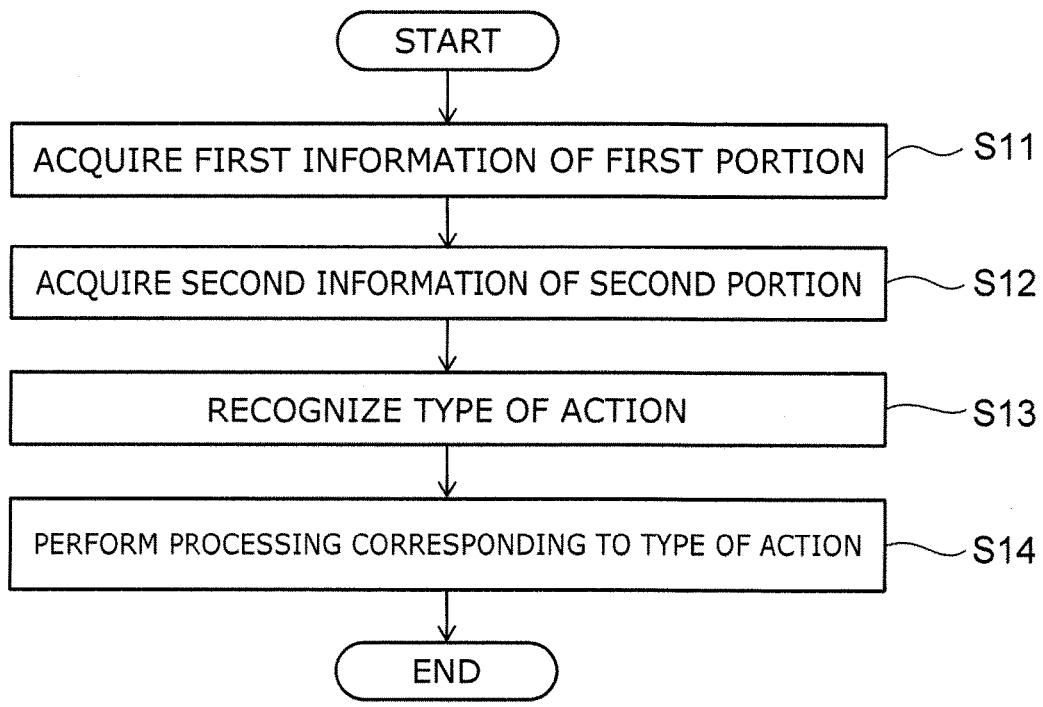
FIG. 6 is a flowchart showing a recognition method using the recognition device according to the first embodiment.

FIG. 6 is a flowchart showing a recognition method using the recognition device according to the first embodiment.

The acquisition unit 30 of the recognition device 100 acquires the first information 14 of the first portion 10a (the wrist) from the first element 10 (step S11) and acquires the second information 24 of the second portion 20a (the finger) from the second element 20 (step S12).

The feature calculator 41 calculates the first feature of the first portion 10a based on the first information 14 and calculates the second feature of the second portion 20a based on the second information 24.

The action recognizer 42 recognizes whether the type of the action of the user is one of the joystick action or the touchpad action based on the change of the first feature and the change of the second feature (step S13).

The processing implementer 43 performs the processing corresponding to the type of the action recognized in step S13 on the prescribed operation object operated by the action of the body 101 (step S14).

At least some of the processing up to step S11 to step S14 may be implemented as a recognition program which is software. The recognition program is a program for implementing the action recognition processing using the recognition device 100.

Figure 7:
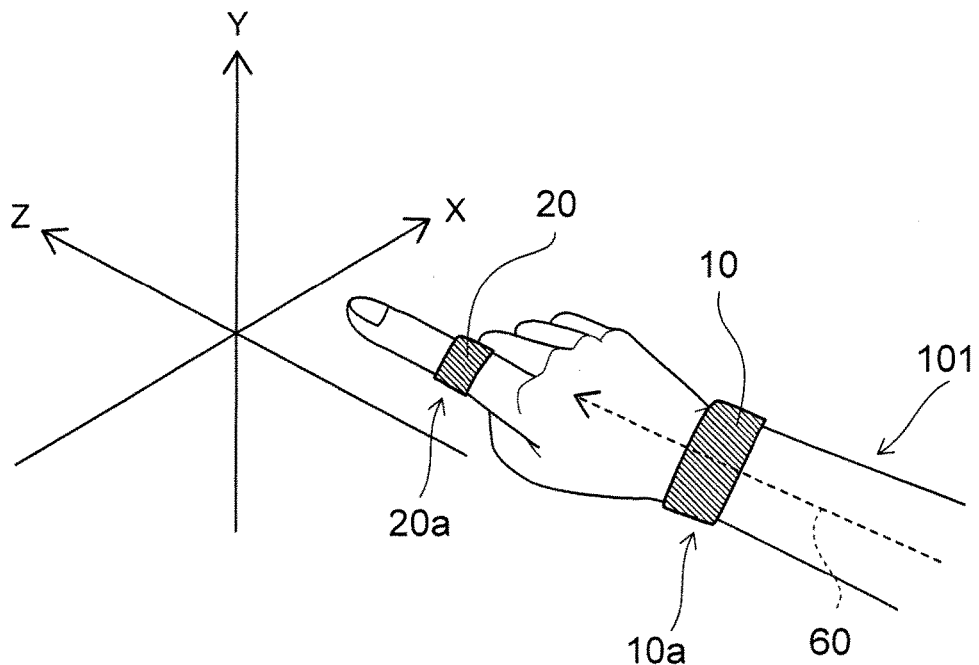
FIG. 7 is a schematic view showing the recognition device according to the first embodiment.

FIG. 7 is a schematic view showing the recognition device according to the first embodiment.

FIG. 7 shows an example of the first axis of the first portion 10a (the wrist) to which the first element 10 is mounted and the second axis of the second portion 20a (the finger) to which the second element 20 is mounted.

For example, the finger tip direction of the body 101 is taken as the Z-axis; the perpendicular direction from the back of the hand is taken as the Y-axis; and the direction perpendicular to the Y-axis and the Z-axis is taken as the X-axis. The first element 10 is mounted to the first portion 10a; and the second element 20 is mounted to the second portion 20a. For example, a reference axis 60 is set in the state in which the first portion 10a and the second portion 20a are extended without bending. In the example, the first axis and the second axis are set to the same reference axis 60. The first axis and the second axis may be different axes.

The reference axis 60 is used as the reference when determining the magnitude (the change amount) and direction of the tilts of the first portion 10a and the second portion 20a. The timing of sensing the reference axis 60 is, for example, when the action (gesture) of the user is started. The trigger of the action start is, for example, when a prescribed voice of the user is sensed. The trigger of the action start may be when the user presses a prescribed button. The trigger of the action start may be when the hand of the user is stationary at a prescribed angle. This may be, for example, the case where the movement amount of the hand is within a prescribed range for a constant amount of time in a state in which the hand is oriented toward the front, etc.

The trigger of the action start may be when a hand configuration of the user is sensed. For example, this is realized by sensing the hand configuration using a camera, etc. The trigger of the action start may be when a prescribed action of the user is sensed. A pressure sensor that is mounted to the finger tip is used to sense the prescribed action. For example, the pressure sensor senses that the finger tip of one hand contacts the palm of the other hand, etc. A myoelectric sensor that is mounted to the finger or the arm may be used to sense the prescribed action. A change of the current flowing in a muscle is sensed by the myoelectric sensor.

Figure 8:
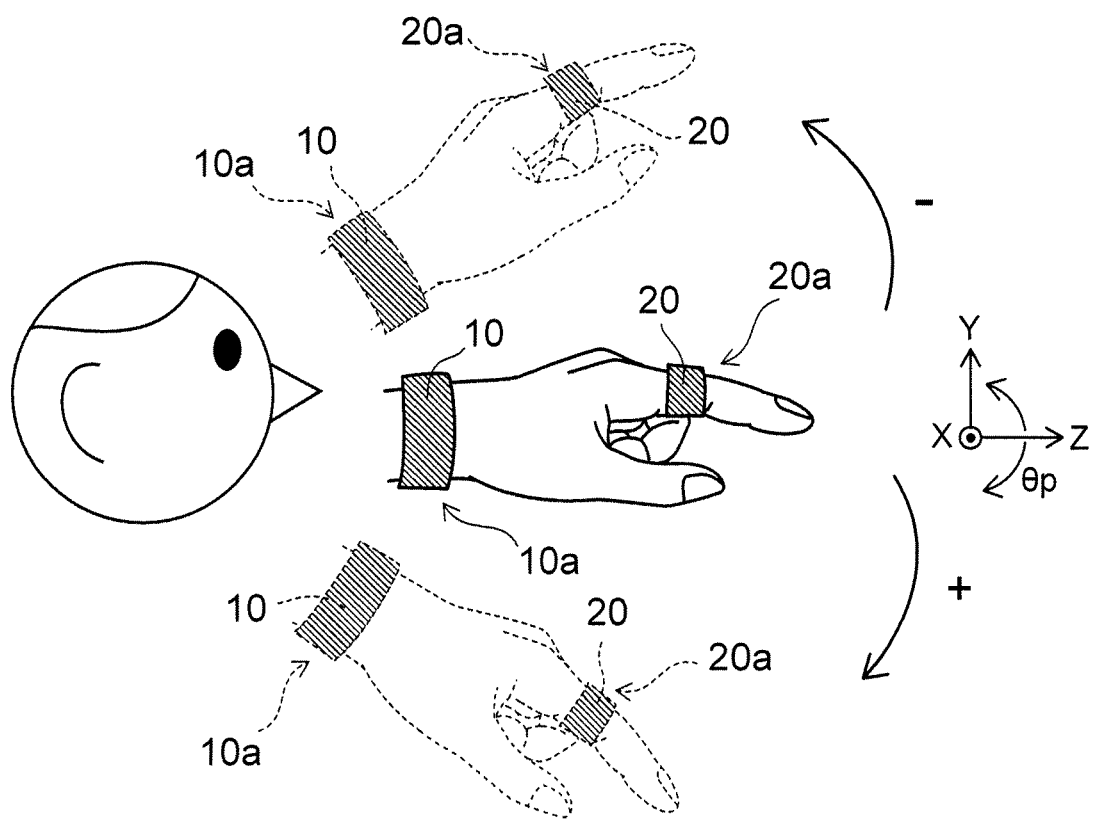
FIG. 8 is a schematic view showing the recognition device according to the first embodiment.
Figure 9:
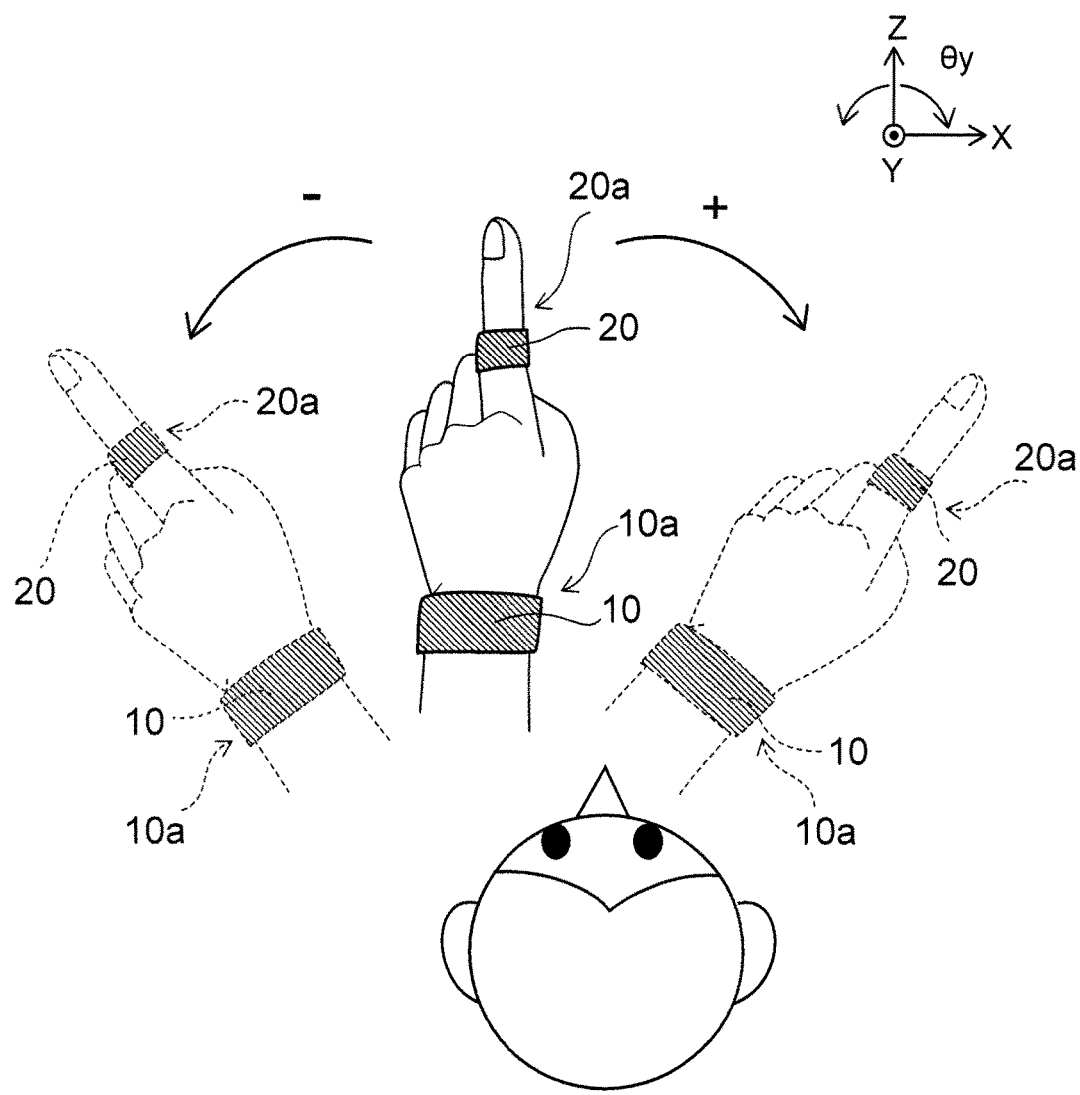
FIG. 9 is a schematic view showing the recognition device according to the first embodiment.
Figure 10:
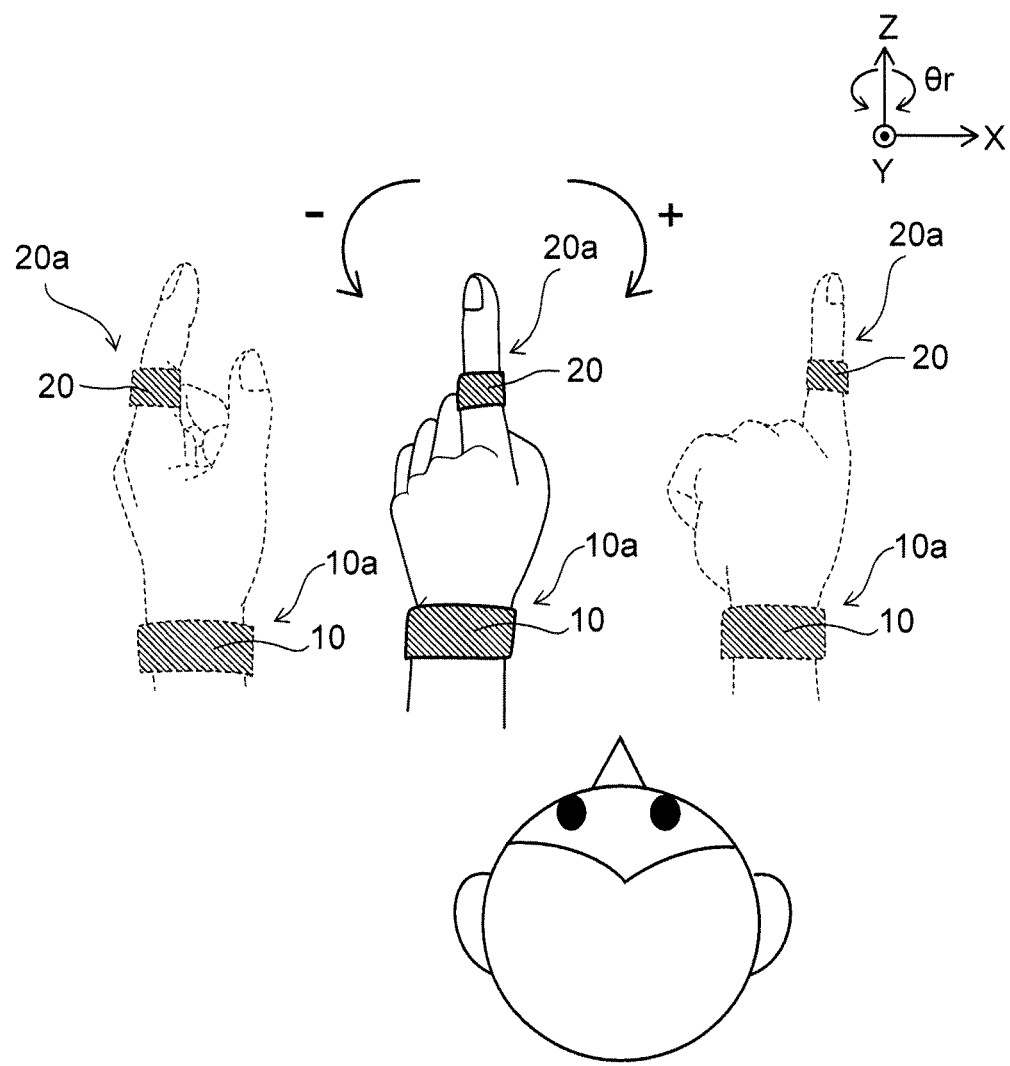
FIG. 10 is a schematic views showing the recognition device according to the first embodiment.

FIG. 8, FIG. 9, and FIG. 10 are schematic views showing the recognition device according to the first embodiment.

FIG. 8 shows the tilt of the pitch angles of the first portion 10a and the second portion 20a; FIG. 9 shows the tilt of the yaw angles of the first portion 10a and the second portion 20a; and FIG. 10 shows the tilt of the roll angles of the first portion 10a and the second portion 20a.

As described above, the three-dimensional tilts of the first portion 10a and the second portion 20a are expressed as viewed from the recognition device 100 by a pitch angle θp of the vertical direction having the X-axis, i.e., left and right, as the axis (FIG. 8), a yaw angle θy of the lateral direction having the Y-axis, i.e., up and down, as the axis (FIG. 9), and a roll angle θr having the Z-axis, i.e., frontward and rearward, as the axis (FIG. 10).

The pitch angle θp, the yaw angle θy, and the roll angle θr recited above change according to the position and angle at which the recognition device 100 is mounted. In the case where the first element 10 is mounted to the first portion 10a (the wrist) and the second element 20 is mounted to the second portion 20a (the finger) as illustrated in FIG. 8, FIG. 9, and FIG. 10, the pitch angle θp, the yaw angle θy, and the roll angle θr are calculated as the vertical direction, the lateral direction, and the rightward/leftward rotation angle as viewed by the user. For example, the pitch angle θp, the yaw angle θy, and the roll angle θr are calculated as relative tilts (rotation angles) from the reference axis 60 with the downward direction, the rightward direction, and the rightward rotation having positive polarity and the upward direction, the left direction, and the leftward rotation having negative polarity with respect to the reference axis 60 of FIG. 7.

Figure 11:
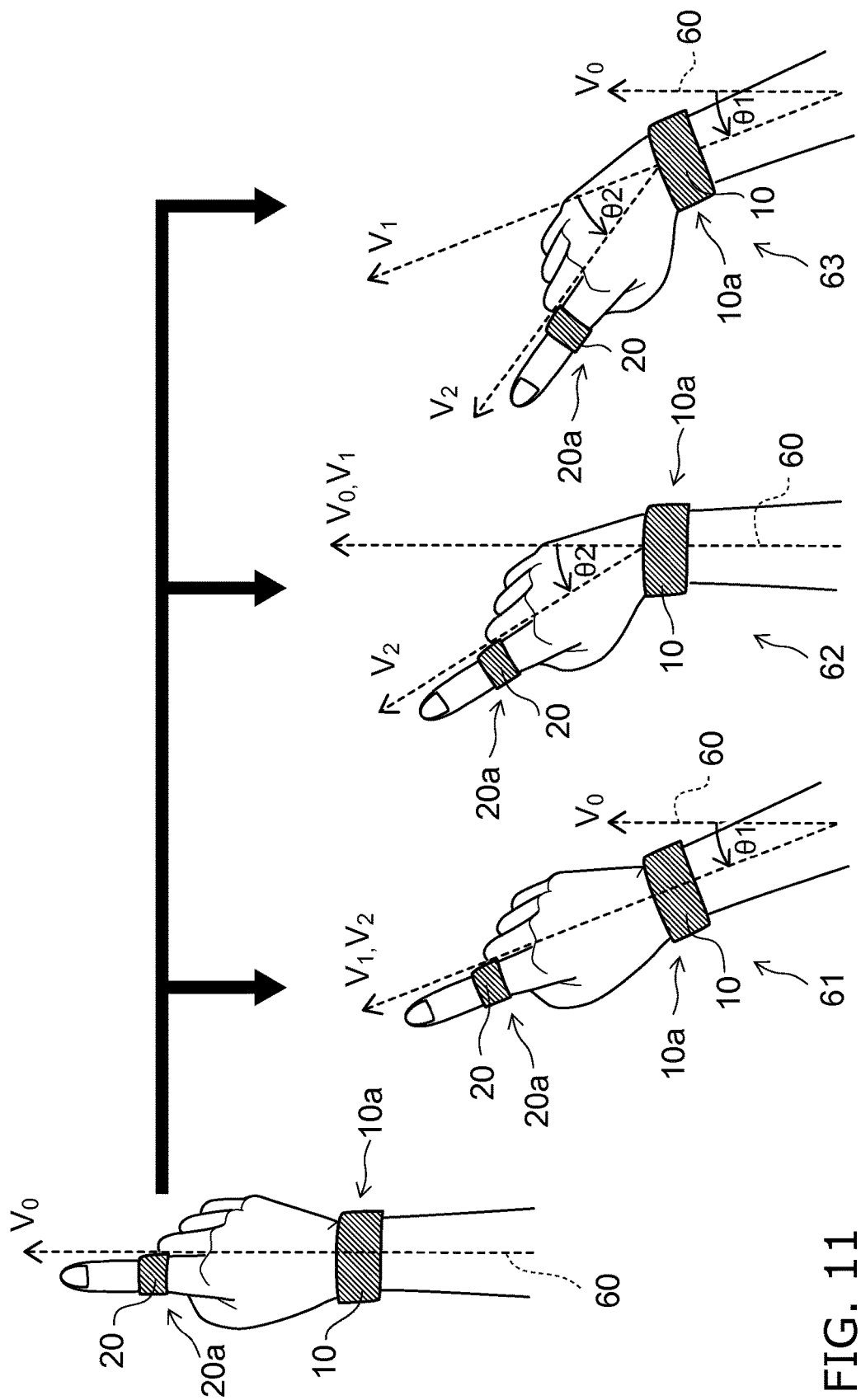
FIG. 11 is a schematic view showing the recognition device according to the first embodiment.

FIG. 11 is a schematic view showing the recognition device according to the first embodiment.

FIG. 11 shows states of the tilt change of the portions for the touchpad action.

As shown in FIG. 7 to FIG. 10, the first element 10 is mounted to the first portion 10a (the wrist); and the second element 20 is mounted to the second portion 20a (the finger). The reference axis 60 (FIG. 7) is set in the state in which the first portion 10a and the second portion 20a are extended without bending. At the reference axis 60, the first portion 10a and the second portion 20a are oriented in a reference direction V0. The touchpad action mainly includes a touchpad action 61 of swinging by using the elbow as the fulcrum without moving the hand beyond the wrist very much, a touchpad action 62 of swinging the hand beyond the wrist by using the wrist as the fulcrum, and a touchpad action 63 of swinging the hand beyond the wrist by using the elbow as the fulcrum.

Here, a direction V1 is a first tilt direction relating to the reference axis 60 of the first portion 10a; and a direction V2 is a second tilt direction relating to the reference axis 60 of the second portion 20a. The change of the first feature is, for example, the change (the first change) of at least one of the pitch angle, the yaw angle, or the roll angle relating to the reference axis 60. Similarly, the change of the second feature is, for example, the change (the second change) of at least one of the pitch angle, the yaw angle, or the roll angle relating to the reference axis 60.

In the case of the touchpad action 61, the first tilt direction V1 and the second tilt direction V2 match. That is, the first absolute value of the first change is, for example, the absolute value (|θ1|) of the angle between the reference direction V0 and the first tilt direction V1. The first polarity of the first change, i.e., the polarity of an angle θ1 is, for example, negative. Here, the change in the left direction with respect to the reference axis 60 is negative; and the change in the rightward direction with respect to the reference axis 60 is positive. On the other hand, similarly to the case of the first change, the second absolute value of the second change is the absolute value (|θ1|) of the angle between the reference direction V0 and the second tilt direction V2. Similarly, the second polarity of the second change is negative.

In the case of the touchpad action 62, the reference direction V0 and the first tilt direction V1 match. Therefore, the first absolute value of the first change is 0. On the other hand, the second absolute value of the second change is, for example, the absolute value (|θ2|) of the angle between the reference direction V0 and the second tilt direction V2. The second polarity of the second change, i.e., the polarity of an angle θ2, is, for example, negative.

In the case of the touchpad action 63, the reference direction V0, the first tilt direction V1, and the second tilt direction V2 are different from each other. That is, the first absolute value of the first change is, for example, the absolute value (|θ1|) of the angle between the reference direction V0 and the first tilt direction V1. On the other hand, the second absolute value of the second change is, for example, the absolute value (|θ2|) of the angle between the first tilt direction V1 and the second tilt direction V2. The first polarity of the first change, i.e., the polarity of the angle θ1, is, for example, negative. The second polarity of the second change, i.e., the polarity of the angle θ2, is, for example, negative. In such a case, the polarity of the angle θ1 is the same as the polarity of the angle θ2.

In the description recited above, the angle |θ1| is calculated by the feature calculator 41 based on the output value (e.g., at least one of the angular velocity value, the acceleration value, or the geomagnetism value) of the first element 10. Similarly, the angle |θ2| is calculated by the feature calculator 41 based on the output value (e.g., at least one of the angular velocity value, the acceleration value, or the geomagnetism value) of the second element 20. The angle θ1 and the angle θ2 may be calculated based on the vectors when the reference direction V0, the first tilt direction V1, and the second tilt direction V2 are projected onto a plane. The plane is, for example, the ZX plane of FIG. 7. In other words, the plane is the ZX plane in the case where the finger tip direction is the Z-axis, the perpendicular direction from the back of the hand is the Y-axis, and the direction perpendicular to the Y-axis and the Z-axis is the X-axis for the reference axis 60 of FIG. 7. The plane may be the YZ plane. The vector component having the greatest change among the vector components projected onto the ZX plane and the YZ plane may be employed for the angle θ1 and the angle θ2.

Figure 12:
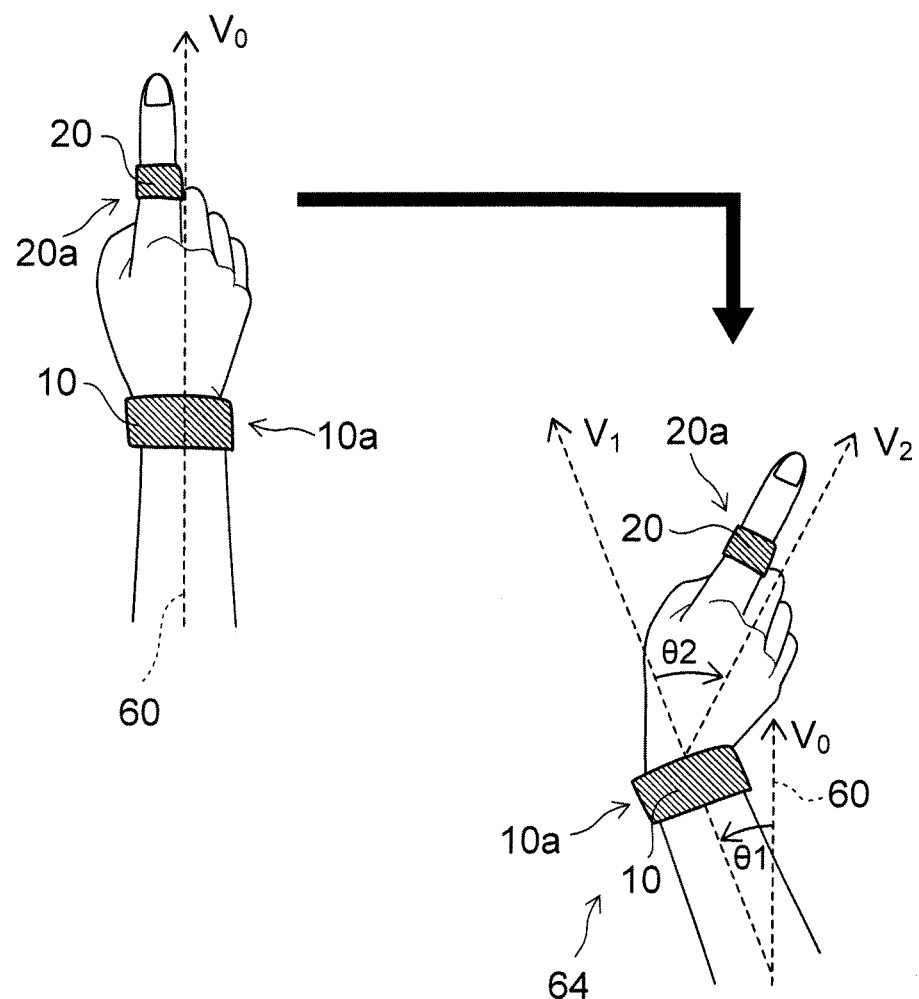
FIG. 12 is a schematic view showing the recognition device according to the first embodiment.

FIG. 12 is a schematic view showing the recognition device according to the first embodiment.

FIG. 12 shows states of the tilt change of the portions for the joystick action.

Similarly to FIG. 11, the reference axis 60 is set in the state in which the first portion 10a and the second portion 20a are extended without bending. At the reference axis 60, the first portion 10a and the second portion 20a are oriented in the reference direction V0. A joystick action 64 is an action in which the wrist is moved using the finger tip as the fulcrum.

In the case of the joystick action 64, the reference direction V0, the first tilt direction V1, and the second tilt direction V2 are different from each other. That is, the first absolute value of the first change is, for example, the absolute value (|θ1|) of the angle between the reference direction V0 and the first tilt direction V1. On the other hand, the second absolute value of the second change is, for example, the absolute value (|θ1|) of the angle between the first tilt direction V1 and the second tilt direction V2. The first polarity of the first change, i.e., the polarity of the angle θ1, is, for example, negative. The second polarity of the second change, i.e., the polarity of the angle θ2, is, for example, positive. In such a case, the polarity of the angle θ1 is the reverse of the polarity of the angle θ2.

Similarly to FIG. 11, the angle |θ1| is calculated by the feature calculator 41 based on the output value (e.g., at least one of the angular velocity value, the acceleration value, or the geomagnetism value) of the first element 10. The angle |θ2| is calculated by the feature calculator 41 based on the output value (e.g., at least one of the angular velocity value, the acceleration value, or the geomagnetism value) of the second element 20. The angle θ1 and the angle θ2 may be calculated based on the vectors when the reference direction V0, the first tilt direction V1, and the second tilt direction V2 are projected onto a plane. The plane is, for example, the ZX plane of FIG. 7.

In the case of the touchpad action (FIG. 11), it can be seen that there is no change in one of the angle θ1 or the angle θ2; or the polarity of the angle θ1 and the polarity of the angle θ2 are the same polarity in the change. On the other hand, in the case of the joystick action (FIG. 12), it can be seen that the polarity of the angle θ1 and the polarity of the angle θ2 are reverse polarities in the change because the movement is performed using the finger tip as the fulcrum. Considering such knowledge, the recognition device 100 recognizes the type of the action of the wrist and the finger according to the method of FIG. 13.

FIG. 13 shows the recognition conditions of the recognition device according to the first embodiment.

The action recognizer 42 recognizes whether the type of the action of the body is one of the joystick action or the touchpad action based on the first absolute value of the first change, the first polarity of the first change, the second absolute value of the second change, and the second polarity of the second change. As described in FIG. 11 and FIG. 12, the first absolute value corresponds to the angle |θ1|; and the first polarity corresponds to the polarity of the angle θ1. Similarly, the second absolute value corresponds to the angle |θ2|; and the second polarity corresponds to the polarity of the angle θ2. According to the recognition conditions of FIG. 13, the action recognizer 42 recognizes whether the type of the action of the body is one of the joystick action or the touchpad action. The specifics are as follows. In the example, a second threshold θt2 is not less than a first threshold θt1.

(1) The action is recognized to be the joystick action in the case where the angle |θ1| is not less than the first threshold θt1, the angle |θ2| is not less than the second threshold θt2, and the polarity of the angle θ1 is the reverse of the polarity of the angle θ2.

(2) The action is recognized to be the touchpad action in the case where the angle |θ1| is not less than the first threshold θt1, the angle |θ2| is not less than the second threshold θt2, and the polarity of the angle θ1 is the same as the polarity of the angle θ2.

(3) The action is arbitrary in the case where the angle |θ1| is less than the first threshold θt1 and the angle |θ2| is less than the second threshold θt2. For example, the action directly previous may be continued. In other words, if the action directly previous is the touchpad action, the touchpad action is continued. If the action directly previous is the joystick action, the joystick action is continued. Or, an operation corresponding to the action may not be received.

(4) The action is recognized to be the touchpad action in cases other than (1) to (3) recited above.

In (4) recited above, in the case where the angle |θ1| is not less than the first threshold θt1 and the angle |θ2| is less than the second threshold θt2, the action recognizer 42 recognizes the action to be the touchpad action regardless of the polarity of the angle θ1 and the polarity of the angle θ2. In the case where the angle |θ1| is less than the first threshold θt1 and the angle |θ2| is not less than the second threshold θt2, the action recognizer 42 recognizes the action to be the touchpad action regardless of the polarity of the angle θ1 and the polarity of the angle θ2.

In the examples of FIG. 11 and FIG. 12, the tilts of the first portion 10a (the wrist) and the second portion 20a (the finger) at the reference axis 60 are set to the same reference direction V0. The tilts of the first portion 10a and the second portion 20a at the reference axis 60 may be different from each other. The angle |θ1| may be the difference from the tilt of the first portion 10a at the reference axis 60. The angle |θ2| may be the difference from the tilt of the second portion 20a at the reference axis 60.

For example, the recognition device 100 may be realized by using a general-purpose computer device as the basic hardware. In other words, the functions of each component included in the recognition device 100 may be realized by causing a processor mounted in the computer device recited above to execute the recognition program.

In such a case, the recognition device 100 may be realized by preinstalling the recognition program recited above in the computer device; or the recognition device 100 may be realized by distributing the recognition program recited above stored in a storage medium such as CD-ROM, etc., or via a network and appropriately installing the recognition program in the computer device. The processor 40 may be realized by appropriately utilizing a storage medium such as memory, a hard disk, CD-R, CD-RW, DVD-RAM, DVD-R, etc., external to or built into the computer device recited above.

According to the embodiment, the coordinate axes are specified when the designated portions (e.g., the wrist and the finger) of the user are in the reference state; and the type of the action (gesture) of the user can be recognized according to the tilt change of the designated portions on the coordinate axes. Thereby, for example, the direction to move an object displayed on the screen of a PC, etc., can be determined. Because the coordinate axes can be appropriately specified, the user may start the action in any direction. For example, the user can perform the operation at any surface (location) such as the palm of the hand, the thigh, a desk, in air, etc.

According to the embodiment, the type of the action of the user (e.g., the joystick action and the touchpad action) can be recognized correctly. Thereby, the operation burden of the user can be reduced by automatically switching between the two action modes of an operation object device such as a PC, etc.

Second Embodiment

Figure 14A:
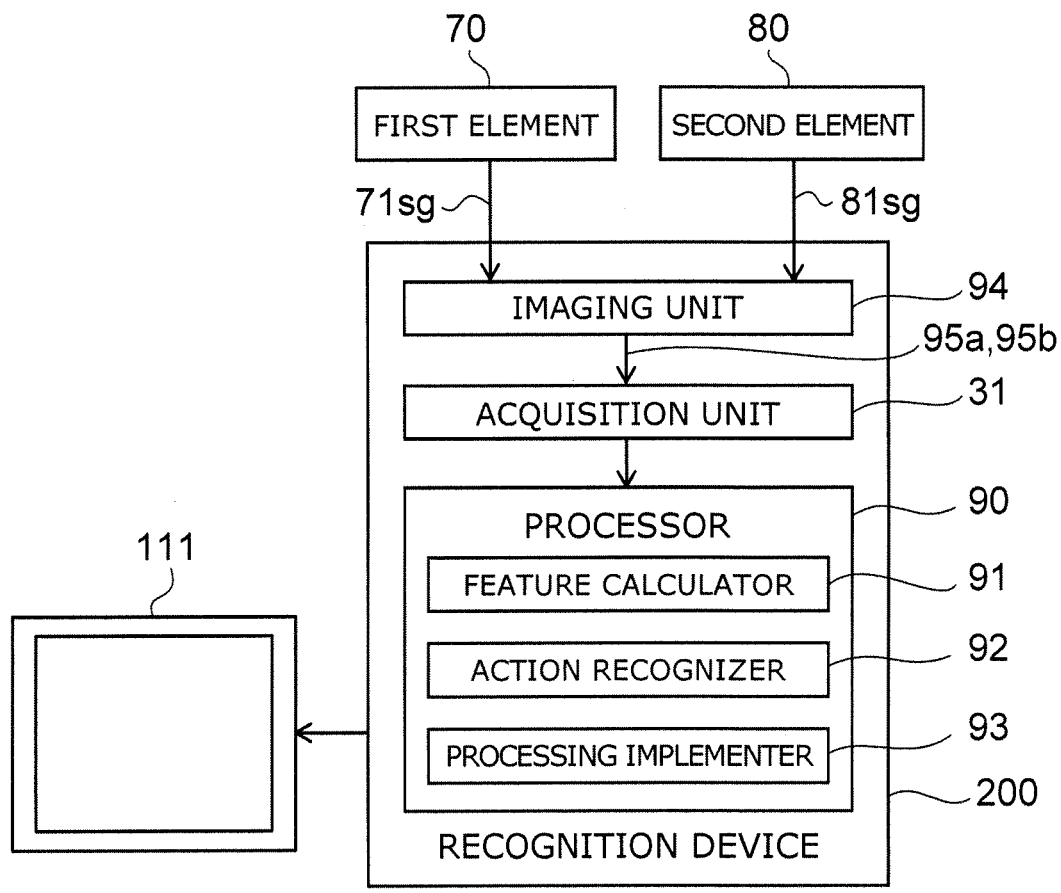
FIGS. 14A and 14B are block diagrams showing a recognition device according to a second embodiment.
Figure 14B:
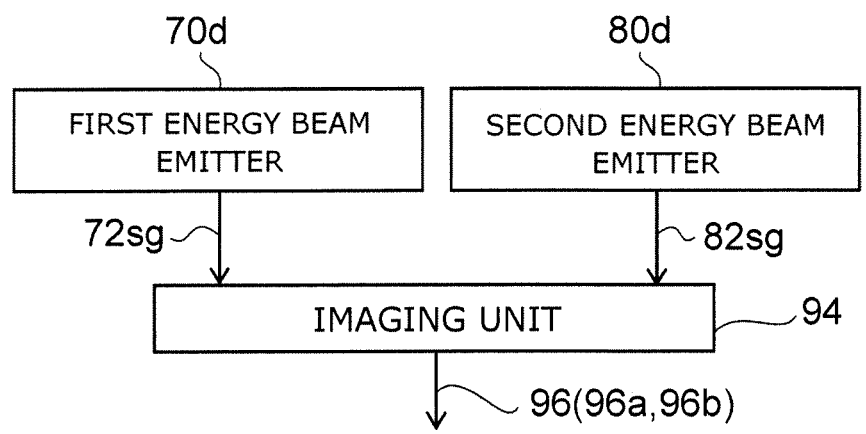

FIGS. 14A and 14B are block diagrams showing a recognition device according to a second embodiment.

FIG. 14A shows the overall configuration of the recognition device; and FIG. 14B shows specific examples of the first element and the second element.

An acquisition unit 31 and a processor 90 are provided in the recognition device 200 of the embodiment. The processor 90 includes a feature calculator 91, an action recognizer 92, and a processing implementer 93. The recognition device 200 further includes an imaging unit 94 that images the first portion 10a (e.g., the wrist) and the second portion 20a (e.g., the finger). For example, the imaging unit 94 is provided in a PC 111. In such a case, it is favorable for the recognition device 200 also to be provided in the PC 111. The recognition device 200 may include a first element 70 and a second element 80.

In the case of the example as shown in FIG. 14B, the first element 70 is a first energy beam emitter 70d that emits a first energy beam 72sg used as a first signal 71sg according to the state of the first portion 10a changing according to the action of the user. The second element 80 is a second energy beam emitter 80d that emits a second energy beam 82sg used as a second signal 81sg according to the state of the second portion 20a changing according to the action of the user. The first element 70 and the second element 80 are used by being mounted to the designated portions of the body 101 of the user, etc. For example, the first element 70 is mounted to the first portion 10a such as the wrist, etc.; and the second element 80 is mounted to the second portion 20a such as the finger, etc. The first element 70 is a ring-shaped member mountable to the first portion 10a such as the wrist, etc. The second element 80 is a ring-shaped member mountable to the second portion 20a such as the finger, etc. The configurations of the first element 70 and the second element 80 are not limited thereto.

In the description recited above, the first element 70 is mounted to the first portion 10a of the body 101 performing the action. The acquisition unit 31 acquires first information 95a. The first information 95a is information relating to the first signal 71sg generated by the first element 70. The first signal 71sg corresponds to the state of the first portion 10a changing according to the action of the body 101. For example, the first energy beam 72sg generated by the first energy beam emitter 70d shown in FIG. 14B is used as the first signal 71sg. For example, first image information 96a of the first energy beam 72sg imaged by the imaging unit 94 is used as the first information 95a. Similarly, the second element 80 is mounted to the second portion 20a of the body 101 performing the action. The acquisition unit 31 acquires second information 95b. The second information 95b is information relating to the second signal 81sg generated by the second element 80. The second signal 81sg corresponds to the state of the second portion 20a changing according to the action of the body 101. For example, the second energy beam 82sg that is generated by the second energy beam emitter 80d shown in FIG. 14B is used as the second signal 81sg. For example, second image information 96b of the second energy beam 82sg imaged by the imaging unit 94 is used as the second information 95b. In the example of FIG. 14B, the imaging unit 94 outputs image information 96 including the first image information 96a and the second image information 96b.

In FIG. 14B, for example, a light emitting element such as an infrared LED (Light Emitting Diode) or the like is used as the first energy beam emitter 70d. In such a case, the first energy beam emitter 70d emits an infrared ray. Similarly, for example, a light emitting element such as an infrared LED or the like is used as the second energy beam emitter 80d. In such a case, the second energy beam emitter 80d emits an infrared ray.

For example, a camera including a CCD (Charge Coupled Device) capable of imaging an energy beam such as an infrared ray or the like is used as the imaging unit 94. In other words, the imaging unit 94 images the first energy beam 72sg emitted from the first energy beam emitter 70d mounted to the first portion 10a. Similarly, the imaging unit 94 images the second energy beam 82sg emitted from the second energy beam emitter 80d mounted to the second portion 20a.

The acquisition unit 31 acquires the image information 96 output from the imaging unit 94. The image information 96 includes the first image information 96a of the first energy beam 72sg imaged by the imaging unit 94 and the second image information 96b of the second energy beam 82sg imaged by the imaging unit 94.

In the embodiment, the first feature includes a value relating to the position inside the three-dimensional space of the first portion 10a. For example, the value relating to the position of the first portion is calculated based on the position of the first signal 71sg imaged by the imaging unit 94. Similarly, the second feature includes a value relating to the position inside the three-dimensional space of the second portion 20a. The value relating to the position of the second portion 20a is calculated based on the position of the second signal 81sg imaged by the imaging unit 94. The first feature and the second feature are calculated by the feature calculator 91.

The change of the first feature is, for example, the change (hereinbelow, called the first change) of the position of the first portion 10a with respect to the reference position provided inside the three-dimensional space. The change of the second feature is, for example, the change (hereinbelow, called the second change) of the position of the second portion 20a with respect to the reference position provided inside the three-dimensional space. The action recognizer 92 recognizes whether the type of the action of the body 101 is one of the joystick action or the touchpad action based on the first distance of the first change and the second distance of the second change. For example, the first distance is calculated as the absolute value of the distance between the first position and the reference position of the first portion 10a on the image. Similarly, for example, the second distance is calculated as the absolute value of the distance between the second position and the reference position of the second portion 20a on the image.

The processing implementer 93 implements, on the operation object operated by the action of the body 101, the processing corresponding to the type of the action of the user, i.e., the joystick action or the touchpad action. The operation object is, for example, an object displayed on the screen of the PC 111. The object includes, for example, a mouse cursor, an image, a designated portion inside the image, etc.

Figure 15:
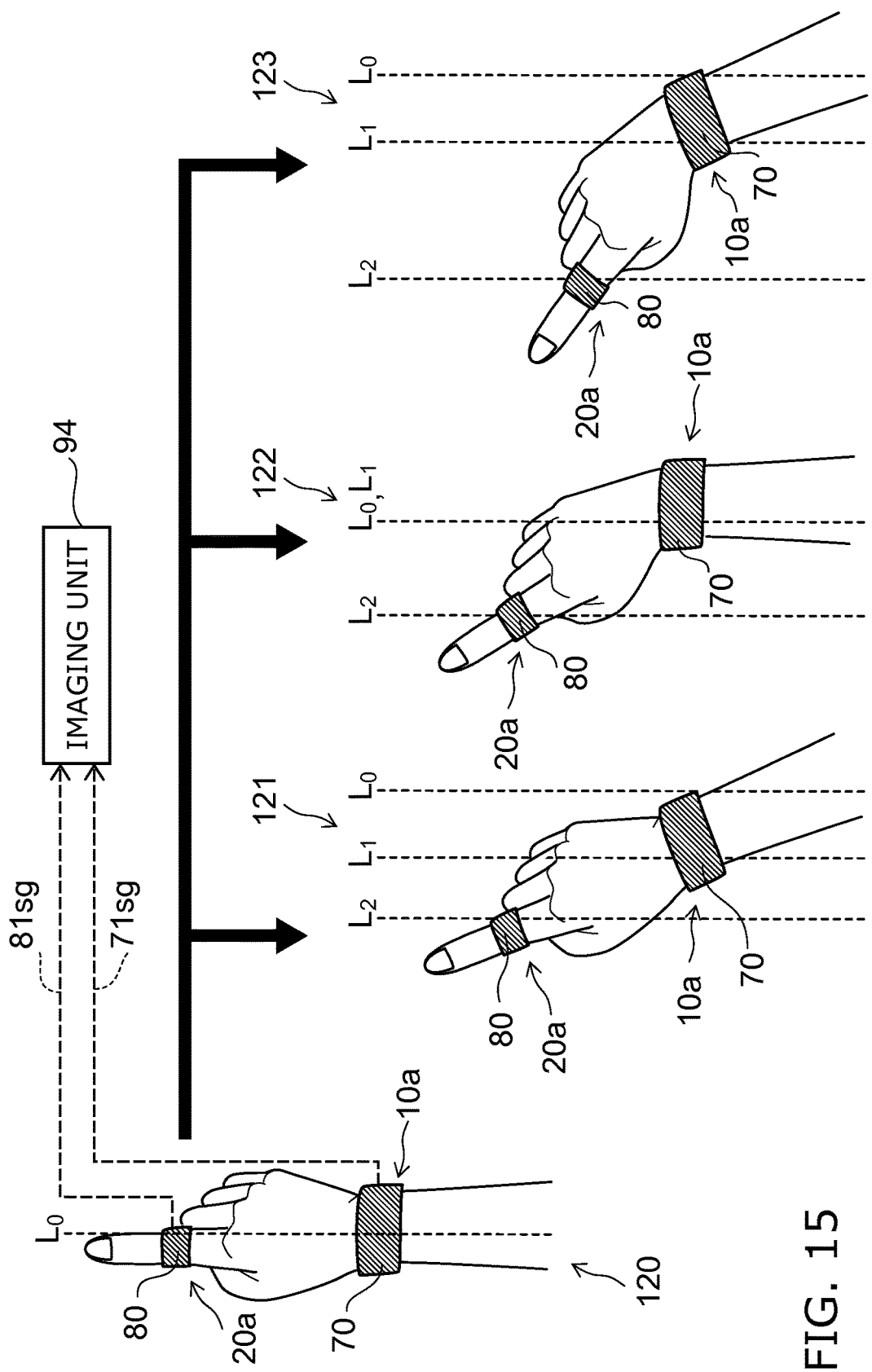
FIG. 15 is a schematic view showing the recognition device according to the second embodiment.

FIG. 15 is a schematic view showing the recognition device according to the second embodiment.

FIG. 15 shows states of the positional change of the portions for the touchpad action.

In the example, the first element 70 is mounted to the first portion 10a (the wrist); and the second element 80 is mounted to the second portion 20a (the finger). For example, the recognition device 200 is provided in the PC 111. A reference state 120 is set to be the state in which the first portion 10a and the second portion 20a are extended without bending. In the reference state 120, the first portion 10a and the second portion 20a are at a reference position L0. In the example, the touchpad action mainly includes a touchpad action 121 of swinging using the elbow as the fulcrum without moving the hand beyond the wrist very much, a touchpad action 122 of swinging the hand beyond the wrist using the wrist as the fulcrum, and a touchpad action 123 of swinging the hand beyond the wrist using the elbow as the fulcrum.

Here, a position L1 is the first position of the first portion 10a; and a position L2 is the second position of the second portion 20a. The change of the first feature is, for example, the change (the first change) from the reference position L0 of the position of the first portion 10a to the first position L1. The change of the second feature is, for example, the change (the second change) from the reference position L0 of the position of the second portion 20a to the second position L2.

In the actions of the touchpad actions 121 to 123, the first distance of the first change is the absolute value ($|L1-L0|$) of the distance between the first position L1 and the reference position L0 of the wrist in the image information 96 including the first portion 10a and the second portion 20a. The second distance of the second change is the absolute value ($|L2-L0|$) of the distance between the second position L2 and the reference position L0 of the finger in the image information 96 including the first portion 10a and the second portion 20a.

In the description recited above, the first distance |L1−L0| is calculated by the feature calculator 91 based on the position of the first energy beam 72sg in the image information 96 acquired from the imaging unit 94. The second distance |L2−L0| is calculated by the feature calculator 91 based on the position of the second energy beam 82sg in the image information 96 acquired from the imaging unit 94.

Figure 16:
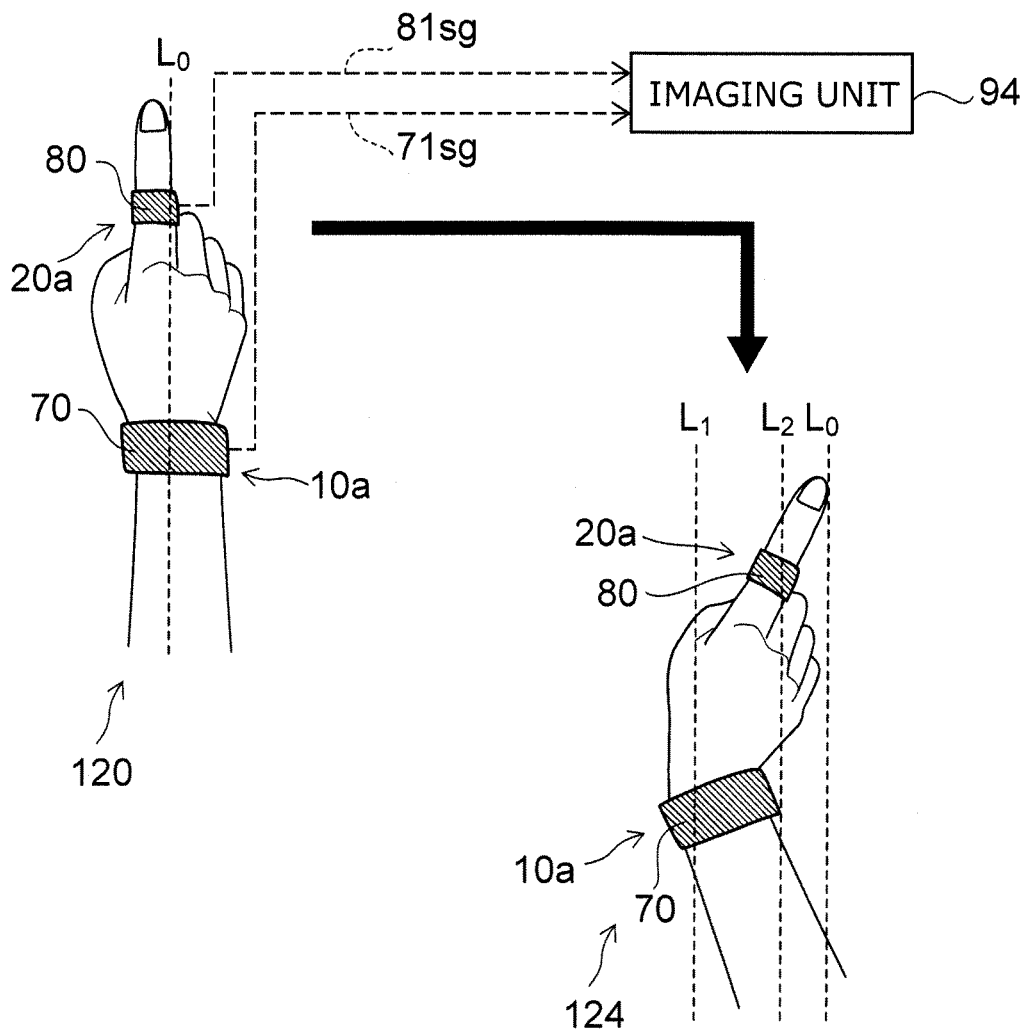
FIG. 16 is a schematic view showing the recognition device according to the second embodiment.

FIG. 16 is a schematic view showing the recognition device according to the second embodiment.

FIG. 16 shows states of the positional change of the portions for the joystick action.

Similarly to FIG. 15, the first portion 10a and the second portion 20a are at the reference position L0 in the reference state 120 in which the first portion 10a and the second portion 20a are extended without bending. A joystick action 124 is the action of moving the wrist using the finger tip as the fulcrum.

Here, the position L1 is the first position of the first portion 10a (the wrist); and the position L2 is the second position of the second portion 20a (the finger). The change of the first feature is, for example, the change (the first change) from the reference position L0 of the position of the first portion 10a to the first position L1. The change of the second feature is, for example, the change (the second change) from the reference position L0 of the position of the second portion 20a toward the second position L2.

In the joystick action 124, the first distance of the first change is the absolute value (|L1−L0|) of the distance between the first position L1 and the reference position L0 of the first portion 10a in the image information 96 including the first portion 10a and the second portion 20a. The second distance of the second change is the absolute value (|L2−L0|) of the distance between the second position L2 and the reference position L0 of the second portion 20a in the image information 96 including the first portion 10a and the second portion 20a.

Similarly to FIG. 15, the first distance |L1−L0| is calculated by the feature calculator 91 based on the position of the first energy beam 72sg in the image information 96 acquired from the imaging unit 94. The second distance |L2−L0| is calculated by the feature calculator 91 based on the position of the second energy beam 82sg in the image information 96 acquired from the imaging unit 94.

In the case of the touchpad action (FIG. 15), the first distance |L1−L0| is less than the second distance |L2−L0|. On the other hand, in the case of the joystick action (FIG. 16), because the movement is performed using the finger tip as the fulcrum, the first distance |L1|L0| is not less than the second distance |L2−L0|. Considering such knowledge, in the case where the position is used as the feature, the action is recognized as recited below. In the example, a second threshold distance Lt2 is not less than a first threshold distance Lt1.

(1) The action is recognized to be the joystick action in the case where the first distance |L1|L0| is not less than the second distance |L2−L0|, and the first distance |L1−L0| is not less than the first threshold distance Lt1.

(2) The action is recognized to be the touchpad action in the case where the first distance |L1−L0| is less than the second distance |L2−L0|, and the second distance |L2−L0| is not less than the second threshold distance Lt2.

(3) The action is arbitrary in cases other than (1) and (2) recited above. For example, the action directly previous may be continued. In other words, if the action directly previous is the touchpad action, the touchpad action is continued. If the action directly previous is the joystick action, the joy-stick action is continued. Or, the reception may not be performed for an operation corresponding to the action.

In the embodiment, the three-dimensional positions of the designated portions are acquired as features. As described above, the three-dimensional positions are estimated by emitting energy beams from the energy beam emitters mounted to the designated portions and sensing the energy beams using an imaging unit (a camera, etc.). The three-dimensional positions may be estimated by tracking the positions of markers mounted to the designated portions using a motion capture system. The three-dimensional positions may be estimated from an image of the designated portions obtained from cameras by multiply mounting the cameras at different angles.

Here, the first element 70 may include the first sensor 10d described in the first embodiment. The second element 80 may include the second sensor 20d described in the first embodiment. In such cases, it may be recognized whether the type of the action of the body 101 is one of the joystick action or the touchpad action by using both the tilt of the designated portion and the position of the designated portion as features. Generally, it is considered that the precision is higher for the case where the tilt is used as the feature than for the case where the position is used as the feature. The action recognized using the tilt may be employed preferentially when the action recognized using the tilt is different from the action recognized using the position.

All of the actions may be determined as likelihoods. The likelihood of the action calculated from the tilts of the designated portions and the likelihood of the action calculated from the positions of the designated portions may be weight-averaged; and the action having the higher likelihood may be used as the recognition result.

According to the embodiment, similarly to the first embodiment, the type of the action of the user (e.g., the joystick action and the touchpad action) can be recognized correctly. Thereby, the operation burden of the user can be reduced by automatically switching between the two action modes of an operation object device such as a PC, etc.

Similarly to the first embodiment, for example, the recognition device 200 also may be realized by using a general-purpose computer device as the basic hardware. In other words, the functions of the components included in the recognition device 200 may be realized by causing a processor mounted in the computer device recited above to execute the recognition program.

Third Embodiment

Figure 17:
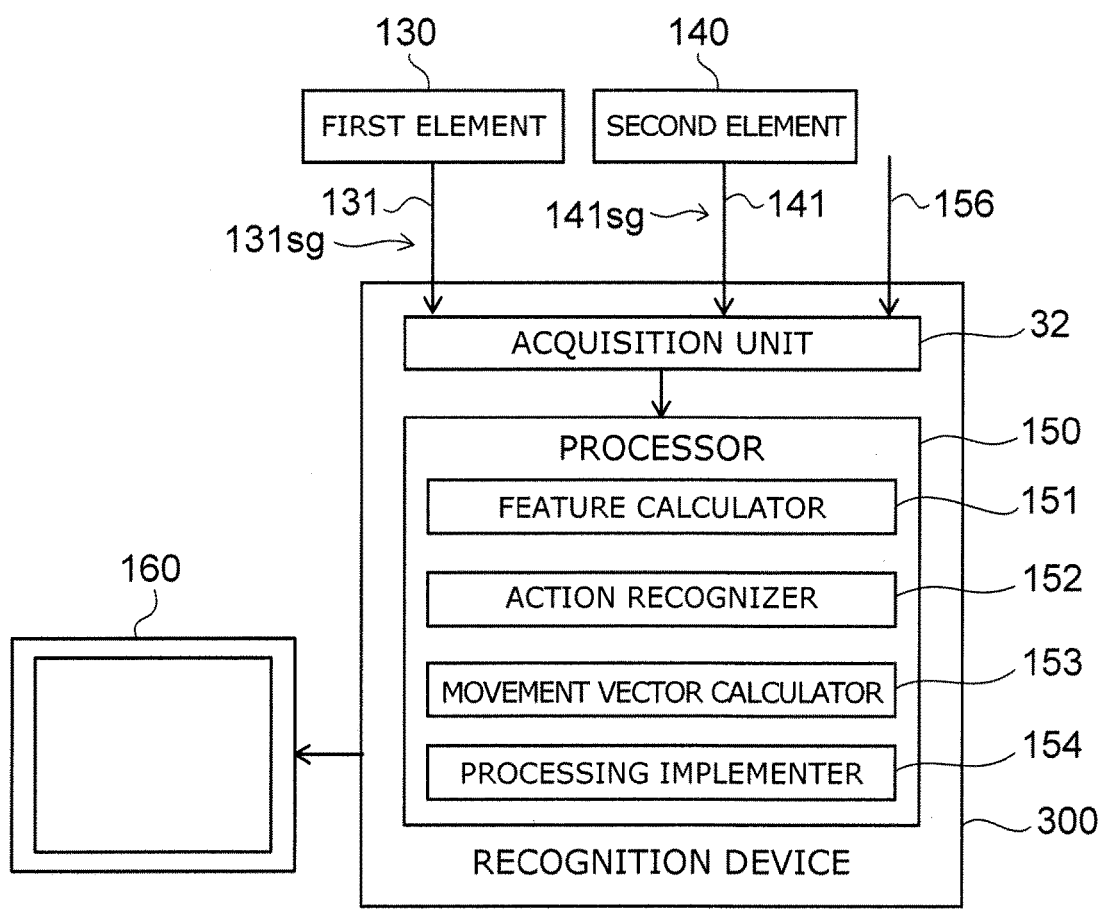
FIG. 17 is a block diagram showing a recognition device according to a third embodiment.

FIG. 17 is a block diagram showing a recognition device according to a third embodiment.

An acquisition unit 32 and a processor 150 are provided in a recognition device 300 of the embodiment. The processor 150 includes a feature calculator 151, an action recognizer 152, a movement vector calculator 153, and a processing implementer 154.

In the example, a first element 130 is the first sensor 10d described in the first embodiment. Similarly, a second element 140 is the second sensor 20d described in the first embodiment. The first element 130 is mounted to the first portion 10a (the wrist, etc.); and the second element 140 is mounted to the second portion 20a (the finger, etc.). The recognition device 300 may include the first element 130 and the second element 140.

In the description recited above, the first element 130 is mounted to the first portion 10a of the body 101 performing the action. The acquisition unit 32 acquires first information

131. The first information 131 is information relating to a first signal 131sg generated by the first element 130. The first signal 131sg corresponds to the state of the first portion 10a changing according to the action of the body 101. For example, the first sensor signal 15sg that is generated by the first sensor 10d shown in FIG. 1B is used as the first signal 131sg. For example, the first sensor information 15 that includes the value of the first sensor signal 15sg is used as the first information 131. In the example of FIG. 17, the first element 130 outputs the first information 131; and the acquisition unit 30 acquires the first information 131.

The second element 140 is mounted to the second portion 20a having a relative positional relationship between the first portion 10a and the second portion 20a that changes according to the action. The acquisition unit 32 acquires second information 141. The second information 141 is information relating to a second signal 141sg generated by the second element 140. The second signal 141sg corresponds to the state of the second portion 20a changing according to the action of the body 101. For example, the second sensor signal 25sg that is generated by the second sensor 20d shown in FIG. 1B is used as the second signal 141sg. For example, the second sensor information 25 that includes the value of the second sensor signal 25sg is used as the second information 141. In the example of FIG. 17, the second element 140 outputs the second information 141; and the acquisition unit 32 acquires the second information 141.

The acquisition unit 32 acquires the first information 131 from the first element 130, the second information 141 from the second element 140, and operation receiving information 156 indicating that the state is in the operation receiving state. For example, the operation receiving state may be from when a sign of the action (gesture) start is sensed to when a sign of the action end is sensed. The operation receiving information 156 is information used as the sign of the action start.

The sign of the action start/end is, for example, when a prescribed voice of the user is sensed. The sign of the action start/end may be when a prescribed button is pressed by the user. The sign of the action start/end may be when the hand of the user is stationary at a prescribed angle. This is, for example, the case where the hand is oriented toward the front and the movement amount of the hand is within a prescribed range for a constant amount of time. The sign of the action start/end may be when a prescribed hand configuration is sensed. For example, it may be considered to sense the hand configuration using a camera, etc. The sign of the action start/end may be when a prescribed action by the user is sensed. For example, the prescribed action may be considered to be performed by sensing using a pressure sensor mounted to the finger tip, a myoelectric sensor attached to the finger or the arm, etc.

The operation receiving state may be the interval in which the touch action is sensed by the pressure sensor, the myoelectric sensor, etc., recited above. Also, the operation receiving state may be the interval in which an application installed in a PC 160 is in a designated state (e.g., an image viewing state, etc.).

The feature calculator 151 calculates the first feature of the first portion 10a and the second feature of the second portion 20a based on the method described in the first embodiment. The action recognizer 152 recognizes whether the type of the action of the body 101 is one of the joystick action or the touchpad action based on the change of the first feature and the change of the second feature. Here, the first portion 10a (e.g., the wrist) and the second portion 20a (e.g., the finger) when the state is switched to the operation receiving state are used as the reference state; and the action of the body 101 may be recognized based on the change from the reference state for the first feature of the first portion 10a and the second feature of the second portion 20a. The first feature is, for example, the tilt of the first portion 10a. The second feature is, for example, the tilt of the second portion 20a.

The movement vector calculator 153 calculates the movement vector for moving the operation object operated by the action of the body 101 when the acquisition unit 32 acquires the operation receiving information 156. Here, the operation object is an object displayed in the screen of the PC 160. The object includes, for example, a mouse cursor, an image, a designated portion inside the image, etc. In the joystick action or the touchpad action, the movement vector calculator 153 calculates the movement vector based on at least one of the magnitude and direction of the change of the first feature of the first portion 10a or the magnitude and direction of the change of the second feature of the second portion 20a. For example, the recognition device 300 may be provided in the PC 160.

For the direction of the movement vector, it is desirable to allot the movement of the X-axis component to left and right and the movement of the Y-axis component to up and down in the coordinate system of FIG. 7 used as the reference. Presetting is performed so that the movement vector is in the rightward direction for the movement of the base of the finger moving in the positive direction of the X-axis for the joystick action. The presetting is performed so that the movement vector is in the rightward direction for the movement of the finger tip moving in the positive direction of the X-axis for the touchpad action.

The presetting is performed so that the movement vector is in the upward direction for the movement of the base of the finger moving in the positive direction of the Y-axis for the joystick action. The presetting is performed so that the movement vector is in the upward direction for the movement of the finger tip moving in the positive direction of the Y-axis for the touchpad action. It is unnecessary to use one of upward, downward, leftward, or rightward; and the calculation may be performed using a direction at an angle in the XY plane of FIG. 7. It is sufficient for the magnitude of the movement vector to be set according to the change of the tilt from the reference tilt for the first element 130 mounted to the first portion 10a or the second element 140 mounted to the second portion 20a.

The movement vector calculator 153 may enlarge the magnitude of the movement vector when the state continues for not less than a prescribed amount of time in which at least one of the magnitude of the change of the first feature or the magnitude of the change of the second feature is not less than a prescribed value. That is, the magnitude of the movement vector is enlarged when the state continues for not less than a prescribed amount of time TO in which the first element 130 or the second element 140 is tilted from the reference axis by not less than the prescribed angle. For example, the enlargement is a magnification corresponding to the time of being tilted not less than the prescribed angle minus the prescribed amount of time TO. Thereby, for example, the object in the screen can be moved gradually by maintaining the state in which the finger is tilted.

The magnitude of the movement vector may be set according to the movement speed of the finger. In such a case, the magnitude of the movement vector may be set to 0 when a movement not less than a prescribed speed is not sensed. In the case where touch sensing of the finger tip can be performed, the magnitude of the movement vector may be changed according to the strength (the pressure) of the pressing. For example, the magnitude of the movement vector is corrected to decrease when the pressure is strong. Thereby, the object in the screen can be caused to appear to move as if having a large amount of friction.

In the description recited above, the tilt of the designated portion is used as the feature. The position of the designated portion described in the second embodiment may be used as the feature. In such a case, the movement vector can be calculated by employing the change of the position instead of the change of the tilt.

For the joystick action or the touchpad action, the processing implementer 154 implements, on the operation object operated by the action of the body 101, processing corresponding to the movement vector. As described above, the operation object is the object displayed on the screen of the PC 160. The object includes, for example, a mouse cursor, an image, a designated portion inside the image, etc.

The processing implementer 154 performs the processing based on the movement vector recited above for the object in the screen of the PC 160. For example, there may be an application in which the object such as the mouse cursor or the like moves in one of upward, downward, leftward, or rightward for the touchpad action and can also move obliquely for the joystick action. In the case where the action of the body is the touchpad action, the object is moved in the direction of the largest component of the up, down, left, and rightward direction of the movement vector. That is, the inner product of the movement vector and each unit vector of the upward direction/downward direction/left direction/rightward direction may be calculated; and the movement may be performed for a distance proportional to the inner product for the direction having the largest value.

Figure 18:
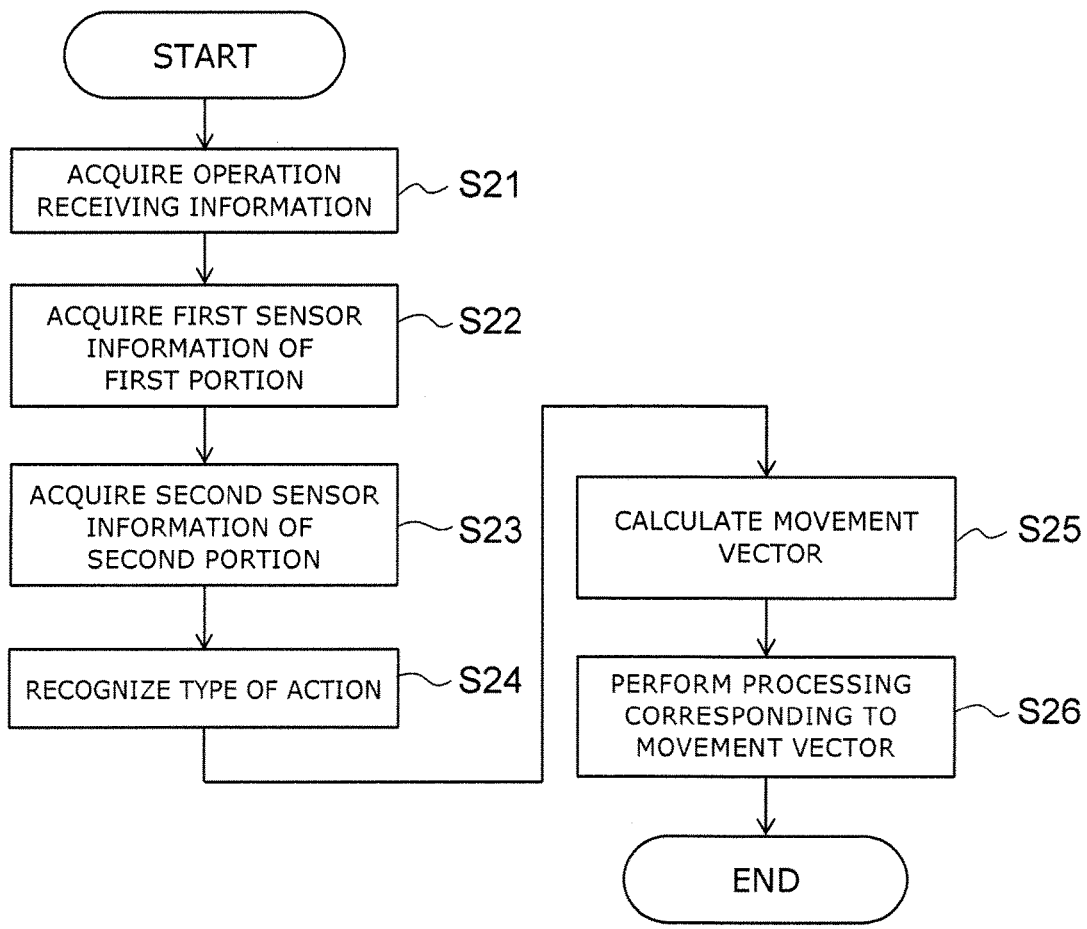
FIG. 18 is a flowchart showing a recognition method of the recognition device according to the third embodiment.

FIG. 18 is a flowchart showing a recognition method of the recognition device according to the third embodiment.

The acquisition unit 32 of the recognition device 300 acquires the operation receiving information 156 (step S21).

The acquisition unit 32 acquires the first information 131 of the first portion 10a (the wrist) from the first element 130 (step S22) and acquires the second information 141 of the second portion 20a (the finger) from the second element 140 (step S23).

The feature calculator 151 calculates the first feature of the first portion 10a based on the first information 131 and calculates the second feature of the second portion 20a based on the second information 141.

The action recognizer 152 recognizes whether the type of the action of the user is one of the joystick action or the touchpad action based on the change of the first feature and the change of the second feature (step S24).

The movement vector calculator 153 calculates the movement vector of the object (the mouse cursor, the image, etc.) in the screen of the PC 160 based on at least one of the magnitude and direction of the change of the first feature of the first portion 10a or the magnitude and direction of the change of the second feature of the second portion 20a (step S25).

In the joystick action or the touchpad action recognized in step S24, the processing implementer 154 performs, on the object in the screen of the PC 160, processing corresponding to the movement vector calculated in step S25 (step S26).

At least some of the processing up to step S21 to step S26 may be implemented as a recognition program which is software.

Figure 19:
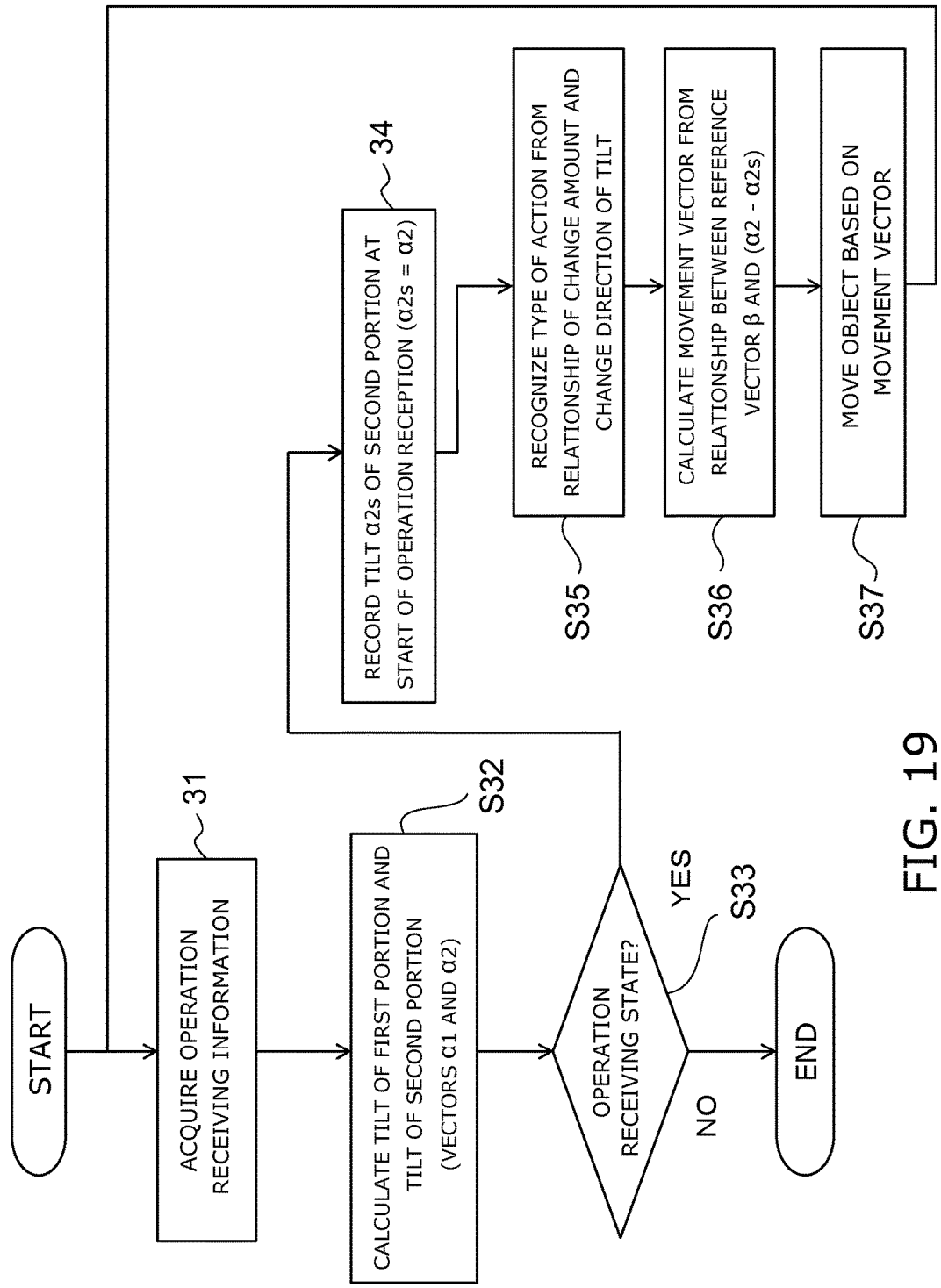
FIG. 19 is a flowchart showing the recognition method of the recognition device according to the third embodiment.

FIG. 19 is a flowchart showing the recognition method of the recognition device according to the third embodiment.

FIG. 19 is a detailed flow of FIG. 18 and shows the case where the action (gesture) of the body 101 is recognized using the tilt of the first portion 10a and the tilt of the second portion 20a as the features. The acquisition unit 32 of the recognition device 300 acquires the operation receiving information 156 (step S31).

At this time, the acquisition unit 32 acquires the first information 131 of the first portion 10a (the wrist) from the first element 130 and acquires the second information 141 of the second portion 20a (the finger) from the second element 140.

The feature calculator 151 calculates the tilt (the first feature) of the first portion 10a based on the first information 131 and calculates the tilt (the second feature) of the second portion 20a based on the second information 141 (step S32). In the example, a vector α1 is the tilt of the first portion 10a; and a vector α2 is the tilt of the second portion 20a.

The action recognizer 152 determines whether or not the state is in the operation receiving state based on the operation receiving information 156 (step S33); and the flow ends in the case where the state is determined not to be in the operation receiving state (the case of NO). In the case where the state is determined to be in the operation receiving state in step S33 (the case of YES), the tilt (a vector α2s) of the second portion 20a at the start of the operation reception is recorded (step S34).

The action recognizer 152 recognizes whether the type of the action of the body 101 is one of the joystick action or the touchpad action based on the change amount and direction of the tilt (step S35). The change amount of the tilt includes the change amount of the tilt (the vector α1) of the first portion 10a and the change amount of the tilt (the vector α2) of the second portion 20a.

The movement vector calculator 153 calculates the movement vector of the object in the screen of the PC 160 from the relationship between a reference vector 13 and the difference (α2−α2s) of the vectors of the second portion 20a (step S36).

In the joystick action or the touchpad action recognized in step S35, the processing implementer 154 moves the object in the screen of the PC 160 based on the movement vector calculated in step S36 (step S37); the flow returns to step S31; and the processing is repeated.

At least some of the processing up to step S31 to step S37 may be implemented as a recognition program which is software.

Figure 20:
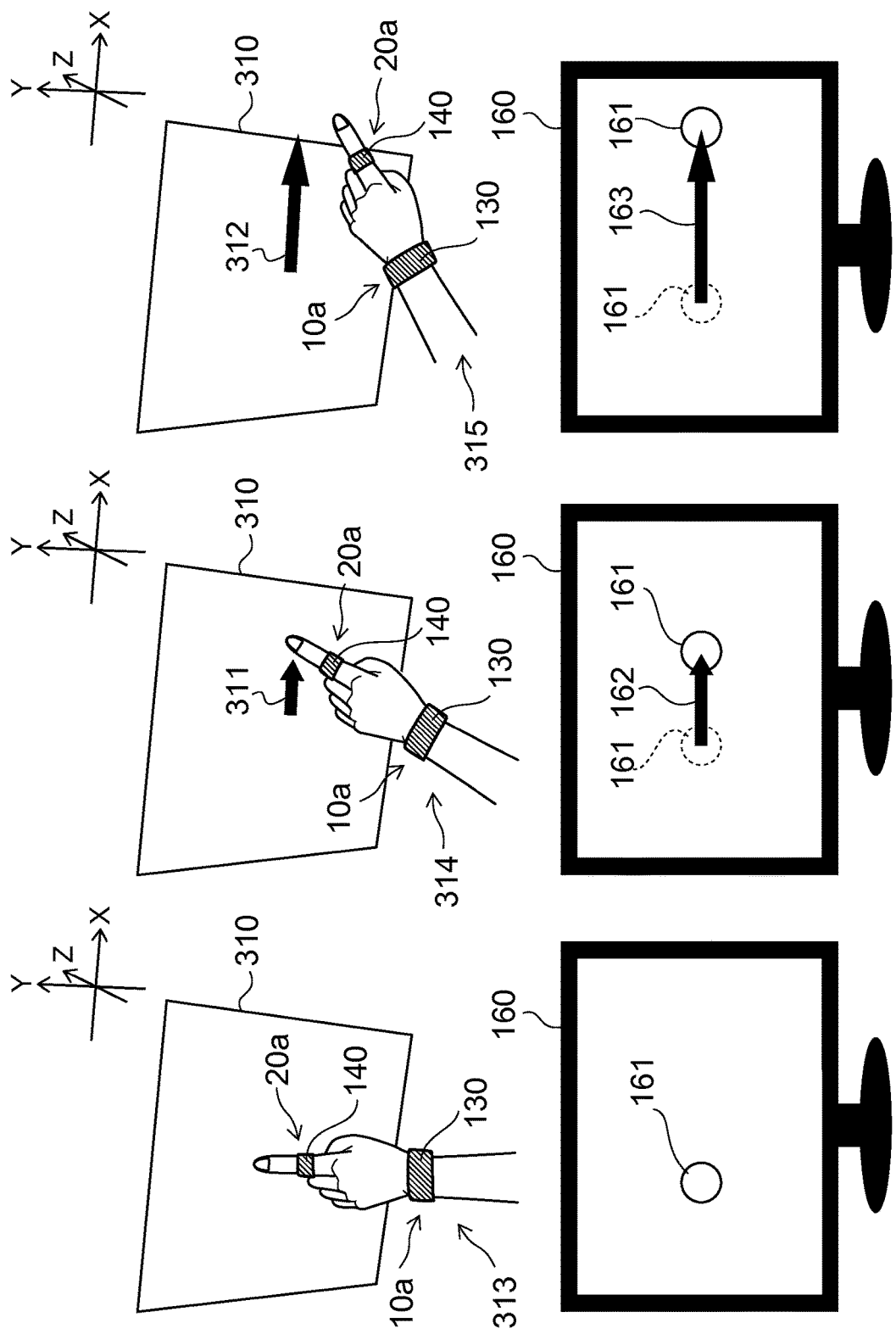
FIG. 20 is a schematic view showing the recognition device according to the third embodiment.

FIG. 20 is a schematic view showing the recognition device according to the third embodiment.

FIG. 20 shows examples of the movement vector for the touchpad action.

In the example, the first element 130 is mounted to the first portion 10a (the wrist); and the second element 140 is mounted to the second portion 20a (the finger). The user is in the state of the first portion 10a and the second portion 20a having an orientation 313 for a surface 310. The user moves the finger tip from the orientation 313 in a positive direction 311 of the X-axis (FIG. 7) by a touchpad action. Thereby, the orientation of the user transitions from the orientation 313 to an orientation 314. At this time, an object 161 on the screen of the PC 160 is moved rightward in the screen (in the case where the X-axis direction is rightward) by an amount of a movement vector 162 having a magnitude proportional to the X-axis component of the tilt change of the second element 140 mounted to the second portion 20a. Accordingly, the screen display of the PC 160 is updated.

Similarly to the description recited above, the user moves the finger tip in a positive direction 312 of the X-axis by a touchpad action from the orientation 313. Thereby, the orientation of the user transitions from the orientation 313 to an orientation 315. That is, the movement amount from the orientation 313 to the orientation 315 is larger than the movement amount from the orientation 313 to the orientation 314. At this time, the object 161 on the screen of the PC 160 moves in the rightward direction by the amount of a movement vector 163 which is larger than the movement vector 162. Accordingly, the screen display of the PC 160 is updated.

Figure 21:
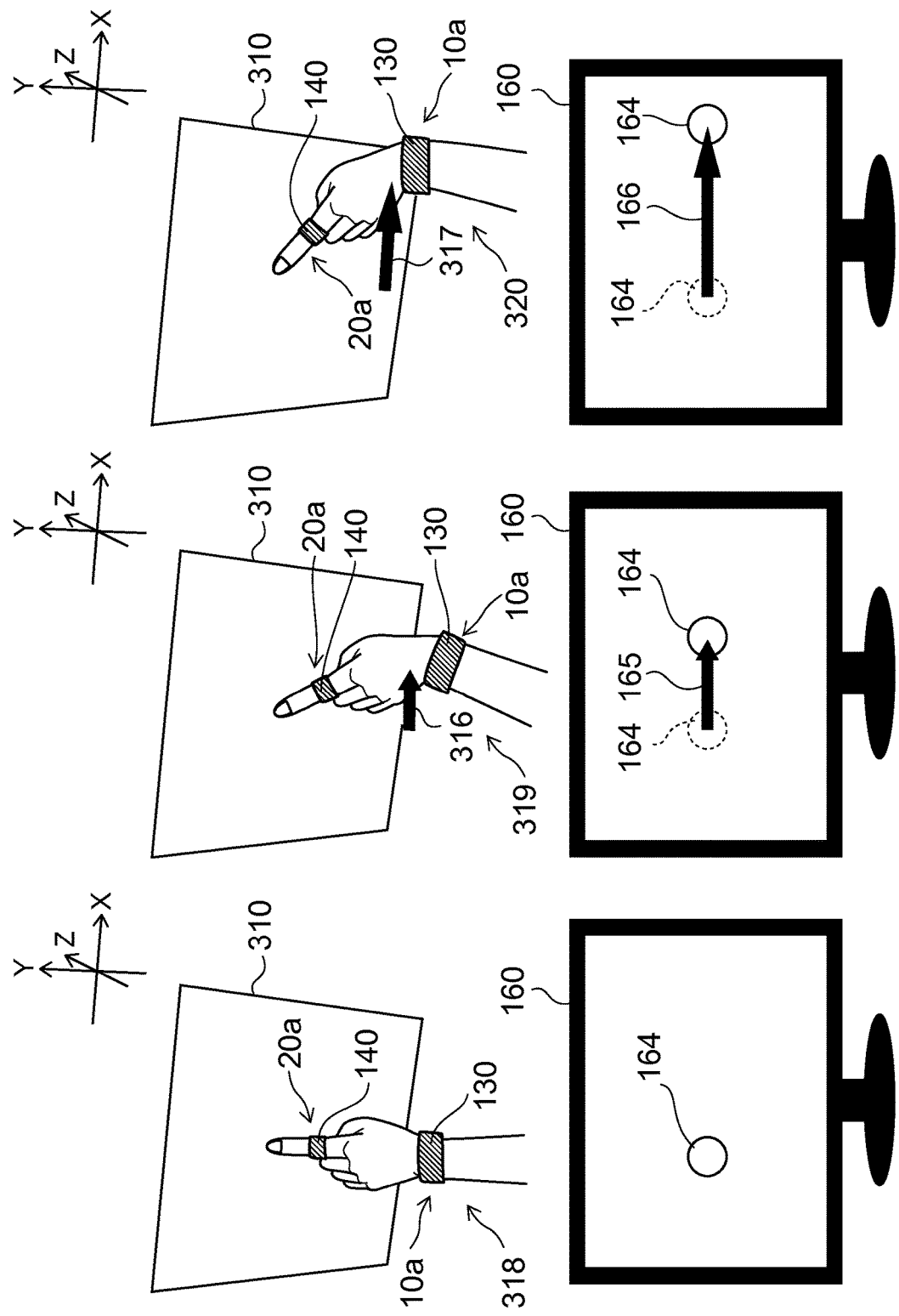
FIG. 21 is a schematic view showing the recognition device according to the third embodiment.

FIG. 21 is a schematic view showing the recognition device according to the third embodiment.

FIG. 21 shows examples of the movement vector for the joystick action.

In the example, similarly to FIG. 20, the first element 130 is mounted to the first portion 10a (the wrist); and the second element 140 is mounted to the second portion 20a (the finger). The user is in the state of the first portion 10a and the second portion 20a having an orientation 318 for the surface 310. The user moves the base of the finger in a positive direction 316 of the X-axis (FIG. 7) by a joystick action from the orientation 318. Thereby, the orientation of the user transitions from the orientation 318 to an orientation 319. At this time, an object 164 on the screen of the PC 160 moves rightward in the screen by the amount of a movement vector 165 having a magnitude proportional to the X-axis component of the tilt change of the second element 140 mounted to the second portion 20a. Accordingly, the screen display of the PC 160 is updated.

Similarly to the description recited above, the user moves the base of the finger in a positive direction 317 of the X-axis by a joystick action from the orientation 318. Thereby, the orientation of the user transitions from the orientation 318 to an orientation 320. That is, the movement amount from the orientation 318 to the orientation 320 is larger than the movement amount from the orientation 318 to the orientation 319. At this time, the object 164 on the screen of the PC 160 moves in the rightward direction by the amount of a movement vector 166 which is larger than the movement vector 165. Accordingly, the screen display of the PC 160 is updated.

Similarly to the first embodiment, for example, the recognition device 300 may be realized using a general-purpose computer device as the basic hardware. In other words, the functions of the components included in the recognition device 300 can be realized by causing a processor mounted in the computer device recited above to execute the recognition program.

Fourth Embodiment

FIG. 22 to FIG. 26 are schematic views showing the recognition device according to the fourth embodiment.

Although the case is described in the first embodiment where sensors are mounted respectively to the wrist and the finger, this is not limited thereto. For example, a similar action recognition can be implemented by using a glove-type sensor and mounting the sensor to the back of the hand instead of the finger. Sensors may be mounted respectively to the upper arm and the wrist. It is also possible to gesture with a foot when the hands are obstructed. For example, sensors may be mounted respectively to the ankle and the toe. Sensors may be mounted respectively to the thigh and the ankle. For example, such a case is applicable to perform an air conditioning operation, a car navigation operation, etc., while gripping the steering wheel when operating a car. The mounting locations of the sensors are not limited to the body. For example, sensors may be mounted respectively to the wrist and a member held by the hand such as a pen, etc.

The first sensor and the second sensor described below are similar to the first sensor 10d and the second sensor 20d of the first embodiment.

Figure 22:
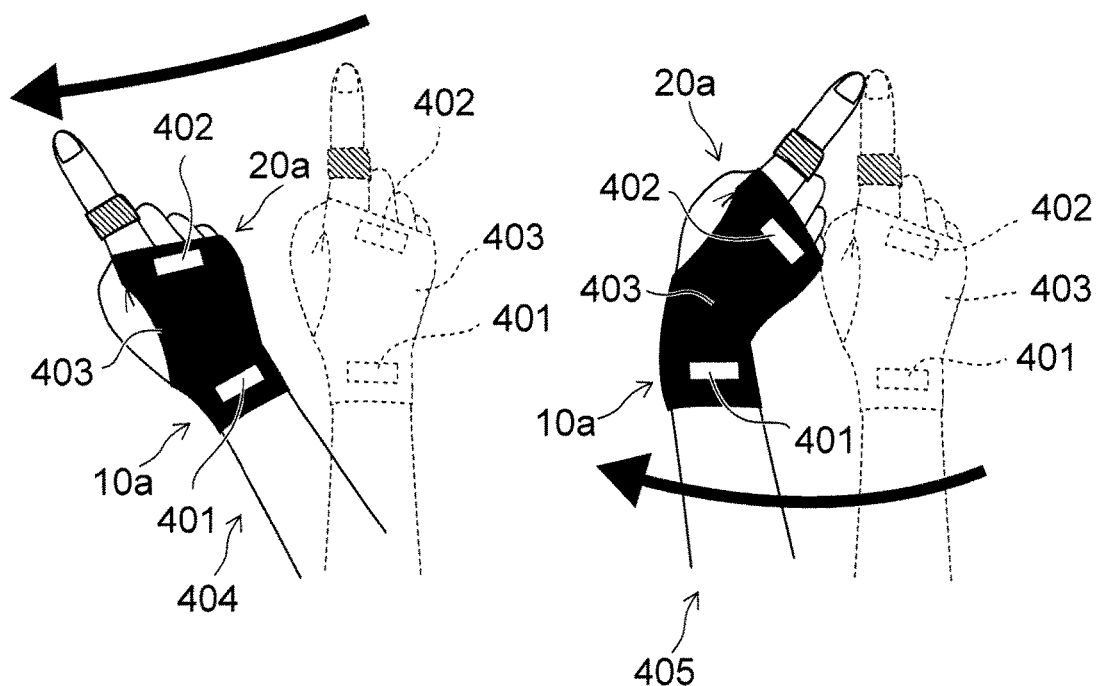
FIG. 22 is a schematic view showing the recognition device according to the fourth embodiment.

In the example of FIG. 22, the first portion 10a is the wrist; the second portion 20a is the back of the hand; and, for example, the sensing of the portions is performed by a first sensor 401 and a second sensor 402 mounted to a glove member 403. Thereby, a touchpad action 404 of moving the finger tip can be recognized; and a joystick action 405 of moving the base of the finger using the finger tip as the fulcrum can be recognized.

Figure 23:
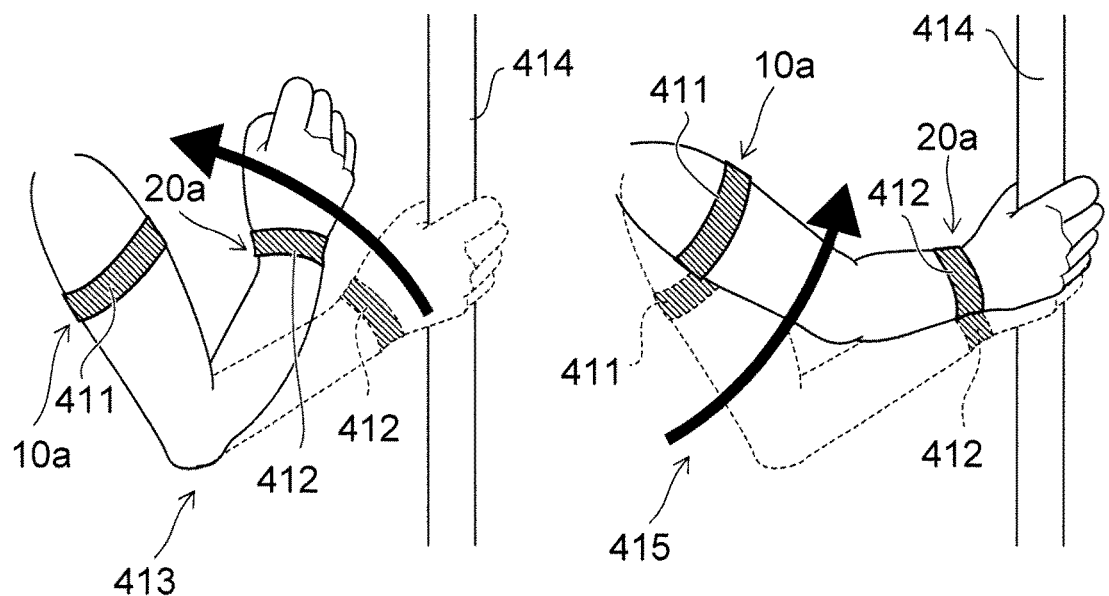
FIG. 23 is a schematic view showing the recognition device according to the fourth embodiment.

In the example of FIG. 23, the first portion 10a is the upper arm; the second portion 20a is the wrist; and the sensing of the portions is performed by a first sensor 411 and a second sensor 412 respectively mounted to each portion. Thereby, a touchpad action 413 of moving the hand with respect to a rod-like member 414 can be recognized; and a joystick action 415 of moving the elbow using the hand as the fulcrum in the state of grasping the rod-like member 414 can be recognized.

Figure 24:
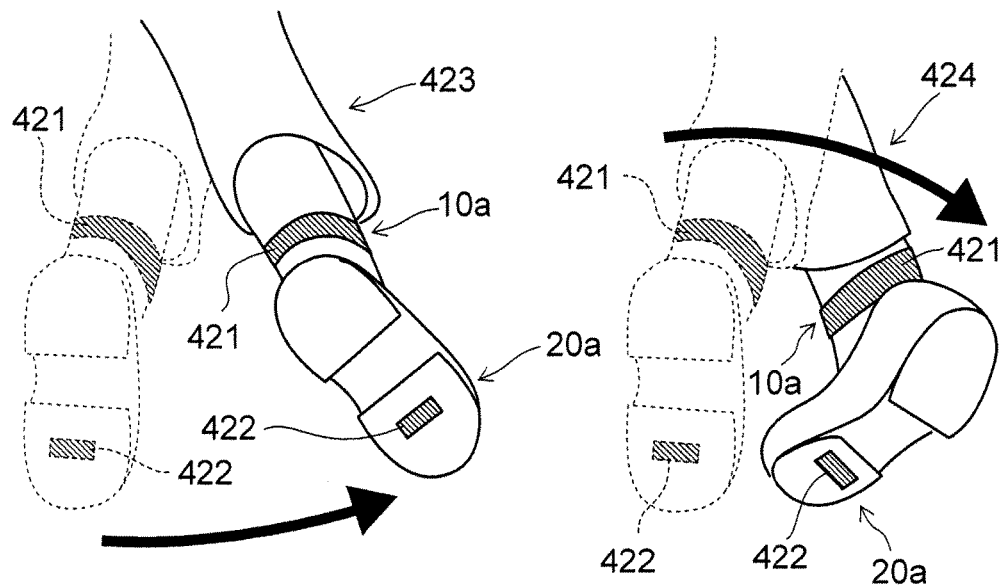
FIG. 24 is a schematic view showing the recognition device according to the fourth embodiment.

In the example of FIG. 24, the first portion 10a is the ankle; the second portion 20a is the toe; and the sensing of the portions is performed by a first sensor 421 and a second sensor 422 (e.g., mounted to the sole of the shoe, etc.) respectively mounted to each portion. Thereby, a touchpad action 423 of moving the toe with respect to the ground surface can be recognized; and a joystick action 424 of moving the ankle using the toe contacting the ground surface as the fulcrum can be recognized.

Figure 25:
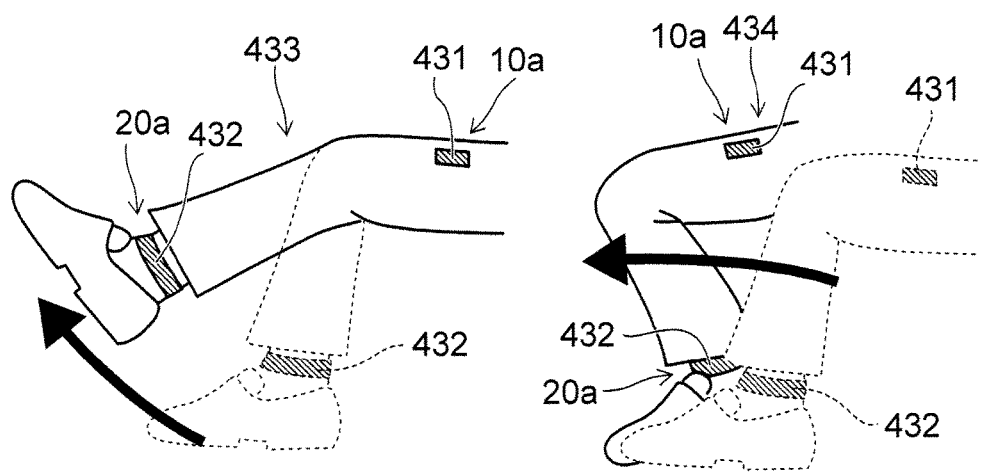
FIG. 25 is a schematic view showing the recognition device according to the fourth embodiment.

In the example of FIG. 25, the first portion 10a is the thigh; the second portion 20a is the ankle; and the sensing of the portions is performed by a first sensor 431 and a second sensor 432 (e.g., mounted to trousers, etc.) respectively mounted to each portion. Thereby, a touchpad action 433 of moving the tip of the foot with respect to the ground surface can be recognized; and a joystick action 434 of moving the knee using the bottom of the foot contacting the ground surface as the fulcrum can be recognized.

Figure 26:
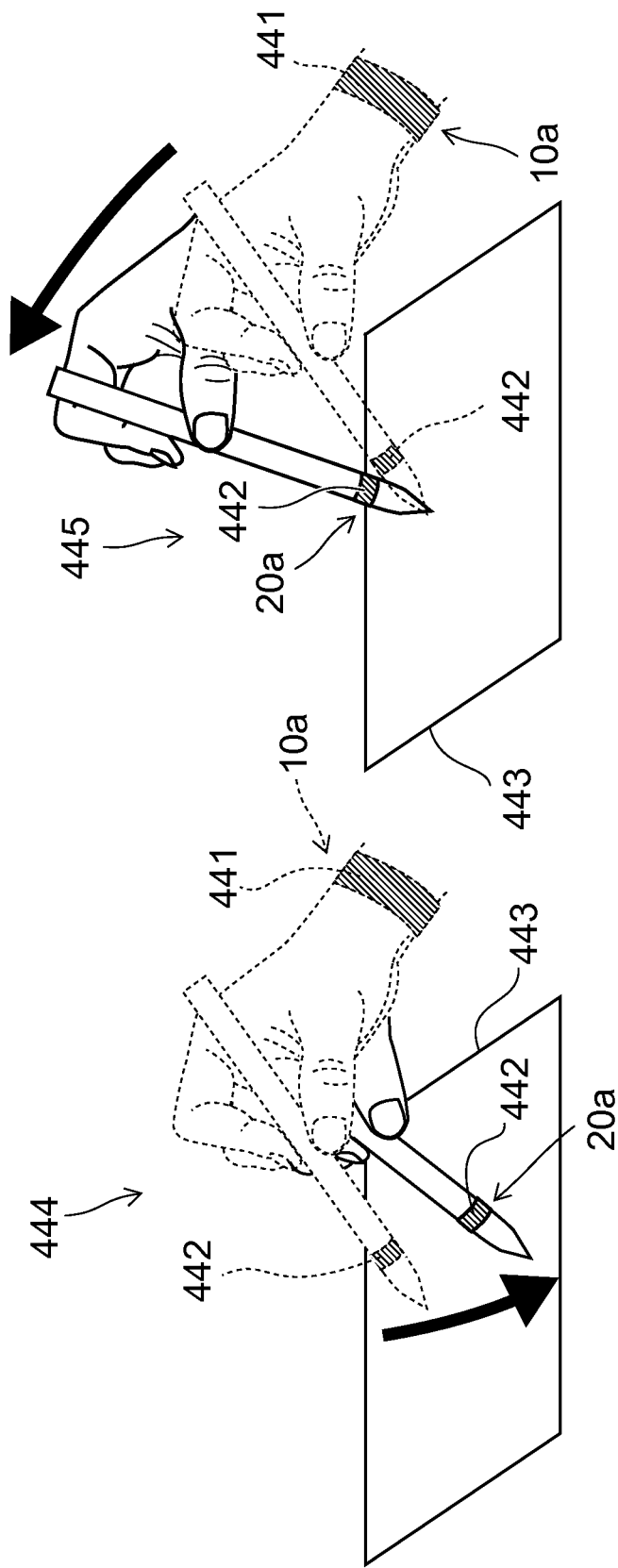
FIG. 26 is a schematic view showing the recognition device according to the fourth embodiment.

In the example of FIG. 26, the first portion 10a is the wrist; the second portion 20a is a member holdable by the hand; and the sensing of the portions is performed by a first sensor 441 and a second sensor 442 (e.g., mounted at the vicinity of the member end) respectively mounted to each portion. The second sensor 442 may be built into the member. Thereby, a touchpad action 444 of moving the member end with respect to a surface 443 can be recognized; and a joystick action 445 of moving the position held by the hand using the member end contacting the surface 443 as the fulcrum can be recognized.

APPLICATION EXAMPLES

The recognition devices of the embodiments are applicable to other devices. The first sensor and the second sensor described below are similar to the first sensor 10d and the second sensor 20d of the first embodiment.

First Application Example

Figure 27:
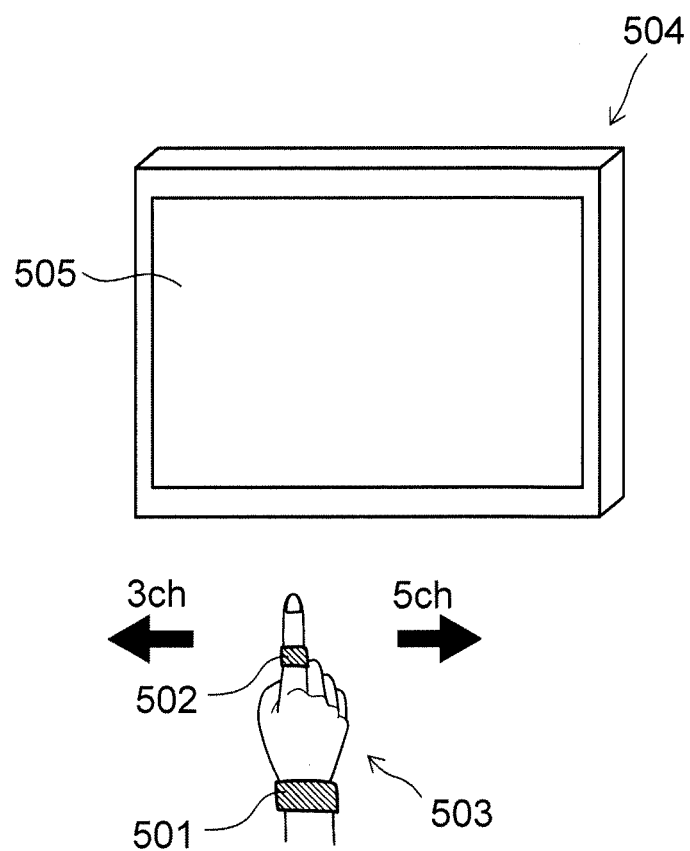
FIG. 27 is a schematic view showing a recognition device according to a first application example.

FIG. 27 is a schematic view showing a recognition device according to a first application example.

In the example, a channel operation is performed by a gesture of a viewer using the recognition device of the embodiment. On a body 503 of the viewer, a first sensor 501 is mounted to the wrist; and a second sensor 502 is mounted to the finger.

Currently, the image of channel 4 (4ch) is displayed on a screen 505 of a television receiver 504. For example, the viewer performs an advancing action of moving the finger tip to the left (the negative direction with respect to the reference) by a touchpad action. The recognition device recognizes the action of the viewer using the first sensor 501 and the second sensor 502. The television receiver 504 changes the current channel 4 to channel 3 (3ch) according to the recognized action. For example, the viewer performs an advancing action of moving the finger tip to the right (the positive direction with respect to the reference) by a touchpad action. The recognition device recognizes the action of the viewer using the first sensor 501 and the second sensor 502. The television receiver 504 changes the current channel 4 to channel 5 (5ch) according to the recognized action. Similar operations are possible by performing joystick actions.

Second Application Example

Figure 28:
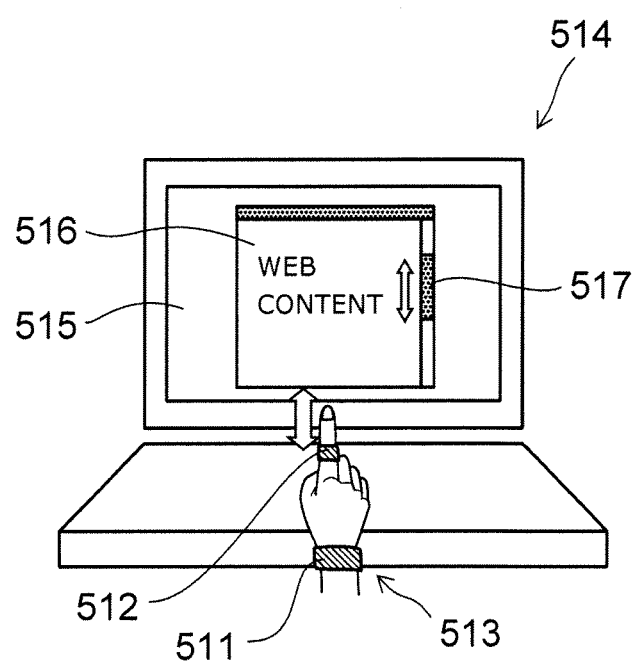
FIG. 28 is a schematic view showing a recognition device according to a second application example.

FIG. 28 is a schematic view showing a recognition device according to a second application example.

In the example, a scroll operation of web content and/or a document is performed by a gesture of the user using the recognition device of the embodiment. On a body 513 of the user, a first sensor 511 is mounted to the wrist; and a second sensor 512 is mounted to the finger.

The web content and/or document is displayed inside a window 516 on a screen 515 of a PC 514. For example, the user performs an advancing action of moving the finger tip upward (in the negative direction with respect to the reference) by a touchpad action. The recognition device recognizes the action of the user using the first sensor 511 and the second sensor 512. The PC 514 scrolls the web content and/or document in the upward direction according to the recognized action. For example, the user performs an advancing action of moving the finger tip downward (in the positive direction with respect to the reference) by a touchpad action. The recognition device recognizes the action of the user using the first sensor 511 and the second sensor 512. The PC 514 scrolls the web content and/or document in the downward direction according to the recognized action. At this time, the scroll amount illustrated by a scroll bar 517 may be a predetermined constant amount. The scroll amount may be changed according to the speed of the advancing action such as increasing for a fast advancing action.

Thereby, the user can view the web content, the document, etc., by scrolling the display content inside the window 516 in the direction in which the advancing action is performed. A similar operation is possible by performing the joystick action as well.

Third Application Example

Figure 29:
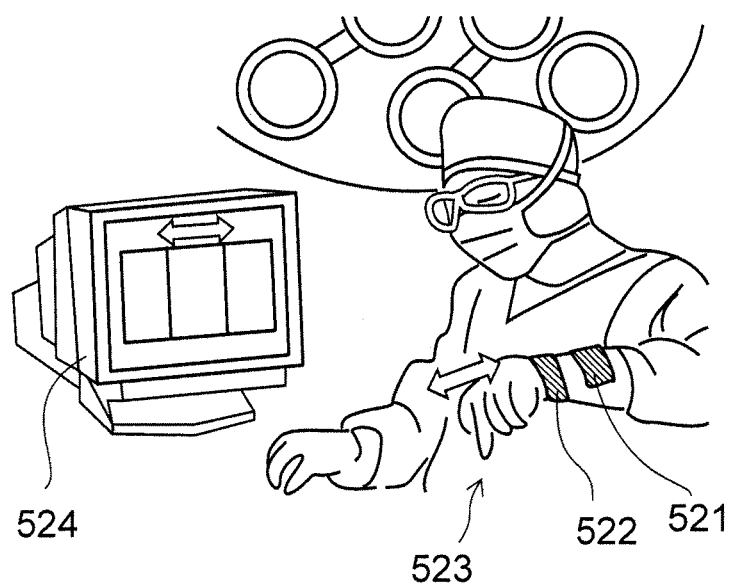
FIG. 29 is a schematic view showing a recognition device according to a third application example.

FIG. 29 is a schematic view showing a recognition device according to a third application example.

In the example, a gesture of a doctor is performed to provide various information relating to a patient using the recognition device of the embodiment. On a body 523 of the doctor, a first sensor 521 is mounted to the wrist; and a second sensor 522 is mounted to the back of the hand. Because the doctor wears gloves during surgery, the glove-type sensor shown in FIG. 22 is favorable. It is favorable for the sensors to be provided at positions that do not obstruct the surgery. An information terminal 524 provides information of the patient such as monitoring information, inspection results, etc.

During surgery, it is necessary for the doctor to maintain clean hands. Therefore, it is difficult for the doctor to operate the information terminal 524 by direct hand contact. Therefore, according to the example, the information terminal 524 can be operated without contact by gestures of the doctor.

During surgery, the doctor performs a touchpad action or a joystick action. The recognition device recognizes the action of the doctor by using the first sensor 521 and the second sensor 522. According to the recognized action, various operations such as screen switching, scrolling, etc., are implemented in the information terminal 524.

Because the operation object can be operated without contact, the recognition device of the embodiment also is favorable when the hands are soiled and cannot be used during cooking, etc. For example, when switching channels of a television during cooking, the channel switching can be performed without using the hands by employing the combination (the ankle and the toe) shown in FIG. 24, etc.

Although a recognition device and a recognition method using the recognition device are described as embodiments recited above, the embodiments may be in the form of a recognition program for causing a computer to execute the recognition method, or the form of a computer-readable recording medium in which the recognition program is recorded.

Specifically, CD-ROM (-R/-RW), a magneto-optical disk, a HD (a hard disk), DVD-ROM (-R/-RW/-RAM), a FD (flexible disk), flash memory, a memory card, a memory stick, other various ROM, RAM, etc., may be used as the recording medium recited above; and the method is easy to realize by recording the recognition program for causing the computer to execute the recognition method of the embodiment described above in such a recording medium and by distributing the recording medium. The recognition method of the embodiment can be executed by mounting the recording medium recited above to an information processing device such as a computer, etc., and by the information processing device reading the recognition program, or by storing the recognition program in a storage medium included in the information processing device and reading the recognition program as necessary.

Thus, according to the embodiments, a recognition device, a recognition method, and a non-transitory recording medium that can reduce the operation burden of the user can be provided.

Hereinabove, embodiments of the invention are described with reference to specific examples. However, the invention is not limited to these specific examples. For example, one skilled in the art may similarly practice the invention by appropriately selecting specific configurations of components such as the acquisition unit and the processor etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all recognition devices, recognition methods and non-transitory recording mediums practicable by an appropriate design modification by one skilled in the art based on the recognition devices, recognition methods and non-transitory recording mediums described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A recognition device, comprising:
   circuitry configured to:
   acquire a first signal and a second signal, the first signal corresponding to a state of a first portion of a limb, the state of the first portion changing according to a performed action, the first signal being generated by a first sensor mounted to the first portion, the second signal corresponding to a state of a second portion of the limb different from the first portion of the limb, the state of the second portion changing according to the action, the second signal being generated by a second sensor mounted to the second portion; and
   calculate a first feature including a value relating to a tilt in a three-dimensional space of a first axis of the first portion based on the first signal, calculate a second feature including a value relating to a tilt in the three-dimensional space of a second axis of the second portion based on the second signal, and recognize whether a type of the action is one of a first action and a second action based on a temporal change of the first feature, a temporal change of the second feature, and a temporal change of a relative positional relationship between the first portion and the second portion,
   a position of a tip of the limb being fixed in the first action, the position of the tip of the limb moving in the second action, and the second portion being between the tip of the limb and the first portion.

2. The device according to claim 1, wherein
the value relating to the tilt of the first axis includes first, second and third angles,
the first, second and third angles are angles of the first axis relative to each of three axes intersecting each other in the three-dimensional space,
the value relating to the tilt of the second axis includes fourth, fifth and sixth angles, and
the fourth, fifth and sixth angles are angles of the second axis relative to each of the three axes intersecting each other in the three-dimensional space.

3. The device according to claim 2, wherein
the change of the first feature includes a change of at least one of the first, second and third angles, and
the change of the second feature includes a change of at least one of the fourth, fifth and sixth angles.

4. The device according to claim 3, wherein
the circuitry is configured to recognize whether the type of action is one of the first action and the second action based on
   a first absolute value of the change of the at least one of the first, second and third angles,
   a first polarity of the change of the at least one of the first, second and third angles,
   a second absolute value of the change of the at least one of the fourth, fifth and sixth angles, and
   a second polarity of the change of the at least one of the fourth, fifth and sixth angles.

5. The device according to claim 4, wherein
the circuitry is configured to recognize the type of action to be the first action based on the first absolute value being not less than a first threshold, the second absolute value being not less than a second threshold, and the first polarity being the reverse of the second polarity, and
the circuitry is configured to recognize the type of action to be the second action based on the first absolute value being not less than the first threshold, the second absolute value being not less than the second threshold, and the first polarity being the same as the second polarity.

6. The device according to claim 4, wherein the circuitry is configured to recognize the type of action to be the second action based on the first absolute value being not less than the first threshold, and the second absolute value being less than the second threshold.

7. The device according to claim 4, wherein the circuitry is configured to recognize the type of action to be the second action based on the first absolute value being less than the first threshold, and the second absolute value being not less than the second threshold.

8. The device according to claim 4, wherein
the first action includes moving one other portion of the second portion using an end of the second portion as a fulcrum, and
the second action includes moving both the one other portion of the second portion and the end of the second portion.

9. The device according to claim 1, wherein
the first signal includes a first sensor signal generated by the first sensor, and
the second signal includes a second sensor signal generated by the second sensor.

10. The device according to claim 9, wherein
the first sensor includes at least one of a first angular velocity sensor, a first acceleration sensor, or a first geomagnetic sensor, and
the second sensor includes at least one of a second angular velocity sensor, a second acceleration sensor, or a second geomagnetic sensor.

11. The device according to claim 1, wherein
the first feature includes a value relating to a position in the three-dimensional space of the first portion, and
the second feature includes a value relating to a position in the three-dimensional space of the second portion.

12. The device according to claim 11, wherein
the change of the first feature includes a change of the position of the first portion with respect to a reference position in the three-dimensional space, and
the change of the second feature includes a change of the position of the second portion with respect to the reference position.

13. The device according to claim 12, wherein the circuitry is configured to recognize whether the type of action is one of the first action and the second action based on a first distance of the change of the first portion and a second distance of the change of the second portion.

14. The device according to claim 13, wherein
the circuitry is configured to recognize the type of action to be the first action based on the first distance being not less than the second distance, and the first distance being not less than a first threshold distance, and
the circuitry is configured to recognize the type of action to be the second action based on the first distance being less than the second distance, and the second distance being not less than a second threshold distance.

15. The device according to claim 11, further comprising a camera configured to image the first portion and the second portion, wherein
the first sensor includes a first energy beam emitter configured to emit a first energy beam according to the state of the first portion changing according to the action,
the first signal being based on first image information of the first energy beam imaged by the camera,
the second sensor includes a second energy beam emitter configured to emit a second energy beam according to the state of the second portion changing according to the action,
the second signal being based on second image information of the second energy beam imaged by the camera.

16. The device according to claim 1, wherein
the first portion includes a wrist, and
the second portion includes a finger.

17. The device according to claim 1, wherein
the first portion includes a wrist, and
the second portion includes a hand-holdable member.

18. A recognition method, comprising:
acquiring a first signal and a second signal, the first signal corresponding to a state of a first portion of a limb performing an action, the state of the first portion changing according to the action, the first signal being generated by a first sensor mounted to the first portion, the second signal corresponding to a state of a second portion of the limb different from the first portion of the limb, the state of the second portion changing according to the action, the second signal being generated by a second sensor mounted to the second portion; and
calculating a first feature including a value relating to a tilt in a three-dimensional space of a first axis of the first portion based on the first signal, calculating a second feature including a value relating to a tilt in the three-dimensional space of a second axis of the second portion based on the second signal, and recognizing whether a type of the action is one of a first action and a second action based on a temporal change of the first feature, a temporal change of the second feature, and a temporal change of a relative positional relationship between the first portion and the second portion,
a position of a tip of the limb being fixed in the first action, the position of the tip of the limb moving in the second action, the second portion being between the tip of the limb and the first portion.

19. A non-transitory recording medium recording a recognition program which, when executed, causes a computer to execute at least:
acquiring a first signal and a second signal, the first signal corresponding to a state of a first portion of a limb performing an action, the state of the first portion changing according to the action, the first signal being generated by a first sensor mounted to the first portion, the second signal corresponding to a state of a second portion of the limb different from the first portion of the limb, the state of the second portion changing according to the action, the second signal being generated by a second sensor mounted to the second portion; and
calculating a first feature including a value relating to a tilt in a three-dimensional space of a first axis of the first portion based on the first signal, calculating a second feature including a value relating to a tilt in the three-dimensional space of a second axis of the second portion based on the second signal, and recognizing whether a type of the action is one of a first action and a second action based on a temporal change of a first feature, a temporal change of the second feature, and a temporal change of a relative positional relationship between the first portion and the second portion,
a position of a tip of the limb being fixed in the first action, the position of the tip of the limb moving in the second action, the second portion being between the tip of the limb and the first portion.

* * * * *